US011790932B2

(12) United States Patent
Tang et al.

(10) Patent No.: US 11,790,932 B2
(45) Date of Patent: Oct. 17, 2023

(54) ACOUSTIC EVENT DETECTION

(71) Applicant: Amazon Technologies, Inc., Seattle, WA (US)

(72) Inventors: Qingming Tang, Cambridge, MA (US); Chieh-Chi Kao, Somerville, MA (US); Qin Zhang, Cambridge, MA (US); Ming Sun, Winchester, MA (US); Chao Wang, Newton, MA (US); Sumit Garg, Acton, MA (US); Rong Chen, Boston, MA (US); James Garnet Droppo, Carnation, WA (US); Chia-Jung Chang, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 123 days.

(21) Appl. No.: 17/547,644

(22) Filed: Dec. 10, 2021

(65) Prior Publication Data
US 2023/0186939 A1 Jun. 15, 2023

(51) Int. Cl.
G10L 25/51 (2013.01)
G10L 25/21 (2013.01)
G10L 25/30 (2013.01)
G06N 3/08 (2023.01)
G06N 3/045 (2023.01)
G10L 15/08 (2006.01)
G10L 15/22 (2006.01)

(52) U.S. Cl.
CPC ............. G10L 25/51 (2013.01); G06N 3/045 (2023.01); G06N 3/08 (2013.01); G10L 25/21 (2013.01); G10L 25/30 (2013.01); G10L 15/08 (2013.01); G10L 15/22 (2013.01); G10L 2015/088 (2013.01); G10L 2015/223 (2013.01)

(58) Field of Classification Search
CPC ...................................................... G10L 25/51
See application file for complete search history.

(56) References Cited

U.S. PATENT DOCUMENTS 9,799,329 B1 * 10/2017 Pogue ..................... G10L 25/51
11,043,218 B1 * 6/2021 Sun .......................... G10L 15/22
11,069,353 B1 * 7/2021 Gao ......................... G10L 25/78
11,132,990 B1 * 9/2021 Sun .......................... G10L 25/21

(Continued)

OTHER PUBLICATIONS

International Search Report and Written Opinion dated Feb. 7, 2023 for International Patent Application No. PCT/US2022/049887, filed Nov. 15, 2022.

Primary Examiner — Olisa Anwah
(74) Attorney, Agent, or Firm — PIERCE ATWOOD LLP

(57) ABSTRACT

A system may include a first acoustic event detection (AED) component configured to detect a predetermined set of acoustic events, and include a second AED component configured to detect custom acoustic events that a user configures a device to detect. The first and second AED components are configured to perform task-specific processing, and may receive as input the same acoustic feature data corresponding to audio data that potentially represents occurrence of one or more events. Based on processing by the first and second AED components, a device may output data indicating that one or more acoustic events occurred, where the acoustic events may be a predetermined acoustic event and/or a custom acoustic event.

20 Claims, 12 Drawing Sheets

(56) References Cited

U.S. PATENT DOCUMENTS

| | | | |
|---|---|---|---|
| 11,205,420 B1 * | 12/2021 | Fu | G06N 3/04 |
| 11,302,329 B1 * | 4/2022 | Sun | G10L 25/51 |
| 11,521,599 B1 * | 12/2022 | Jose | G10L 15/05 |
| 2019/0043489 A1 | 2/2019 | Lopatka et al. | |
| 2020/0241991 A1 | 7/2020 | Patton et al. | |

* cited by examiner

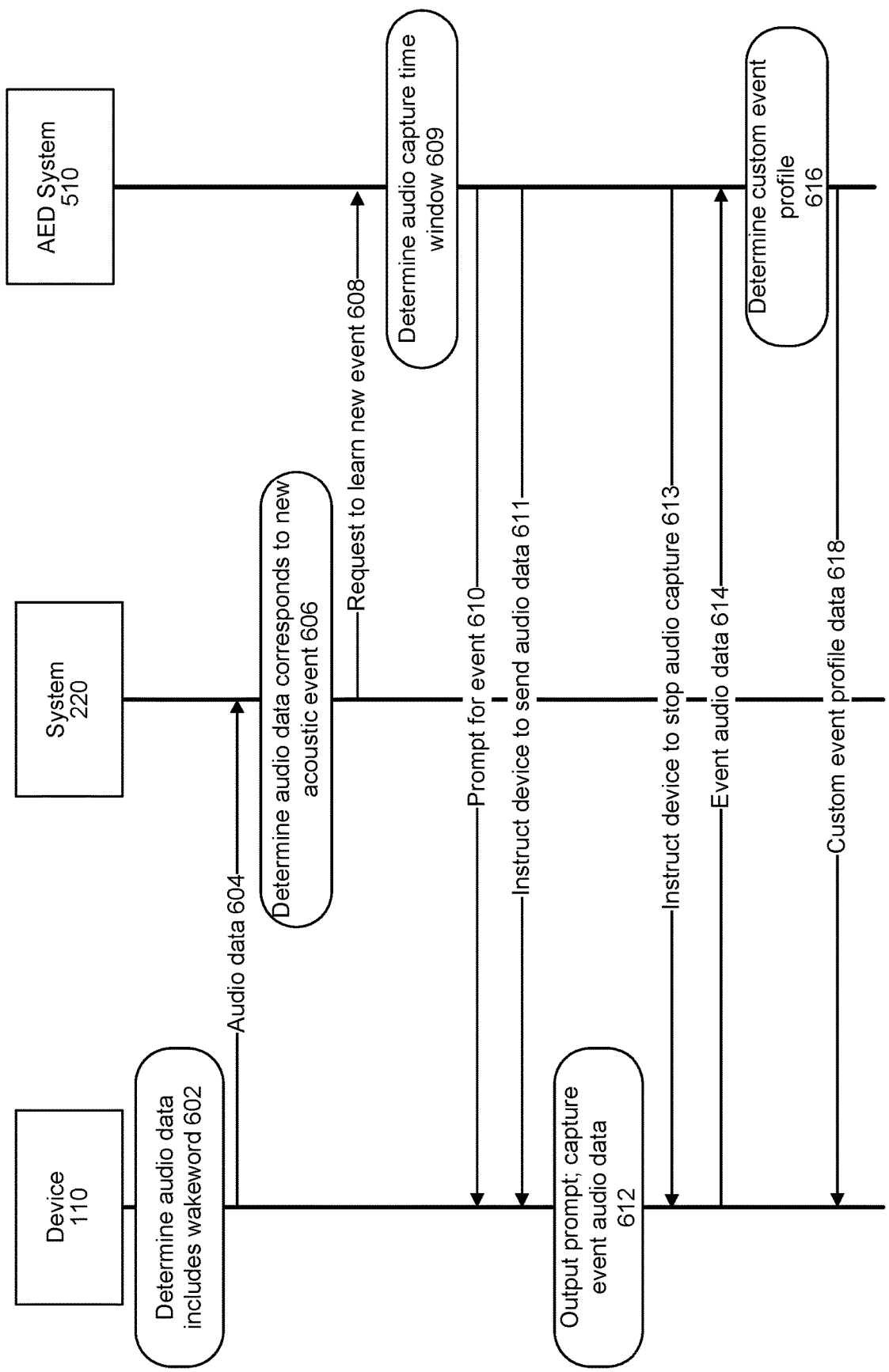

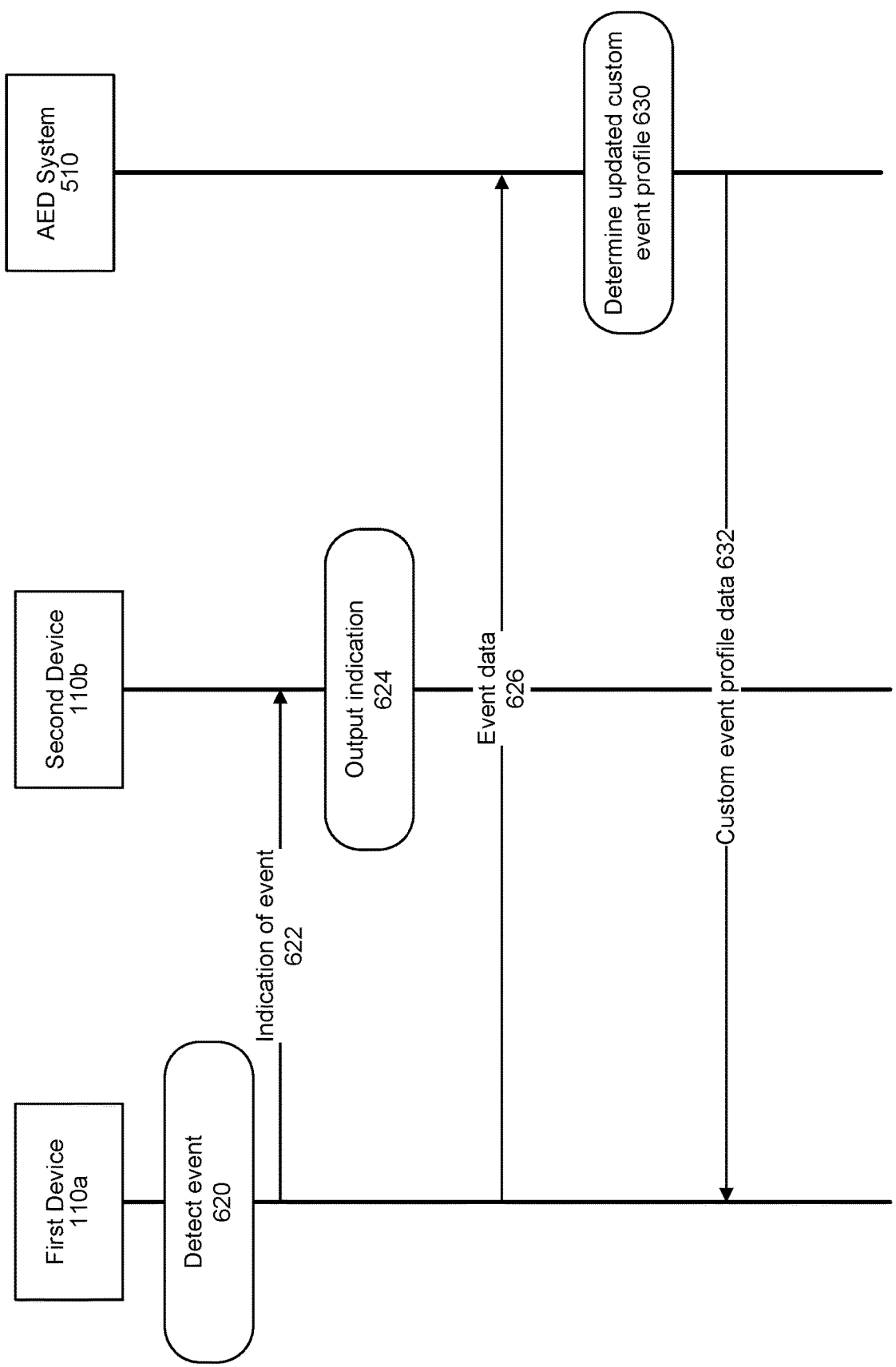

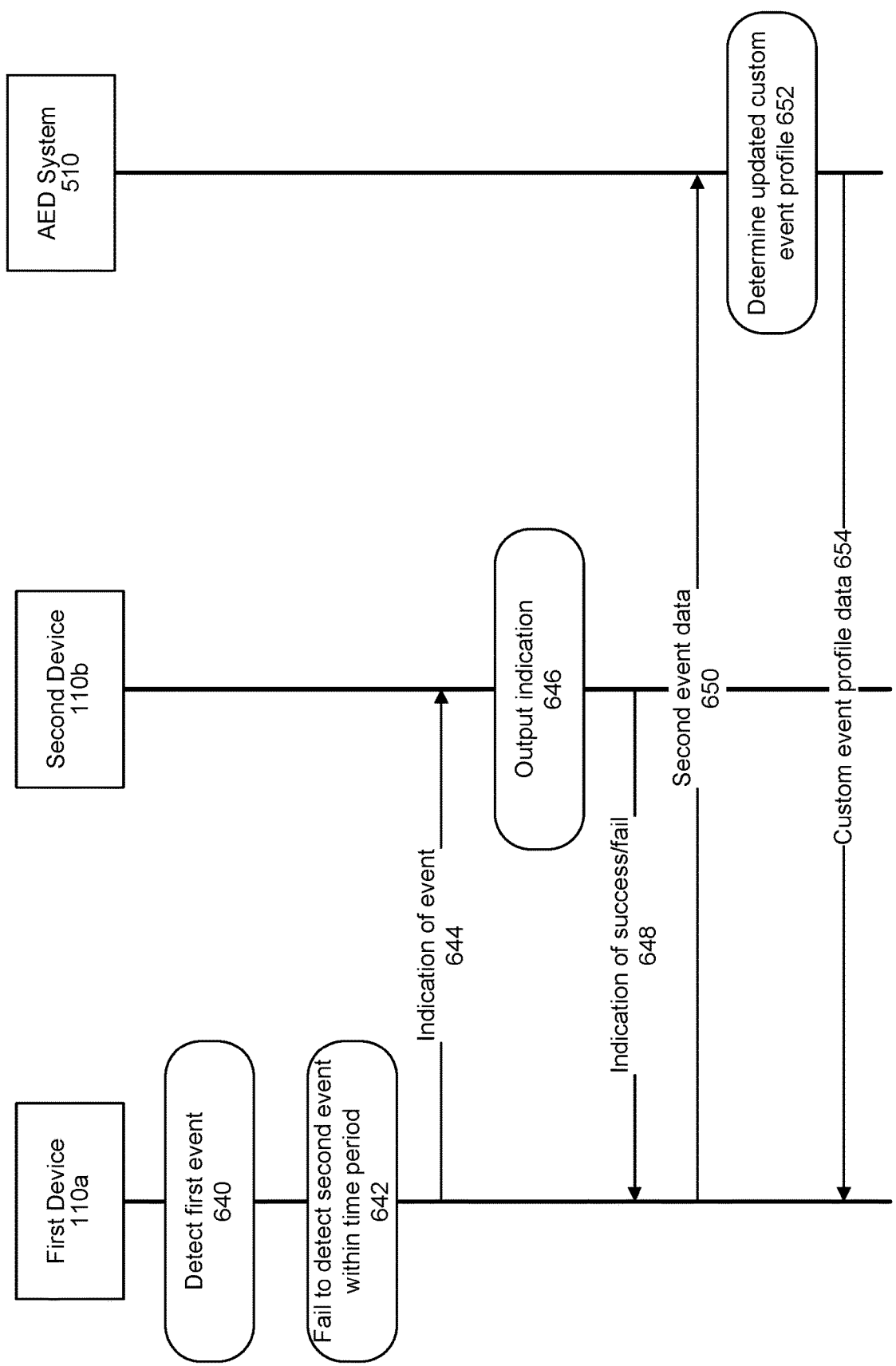

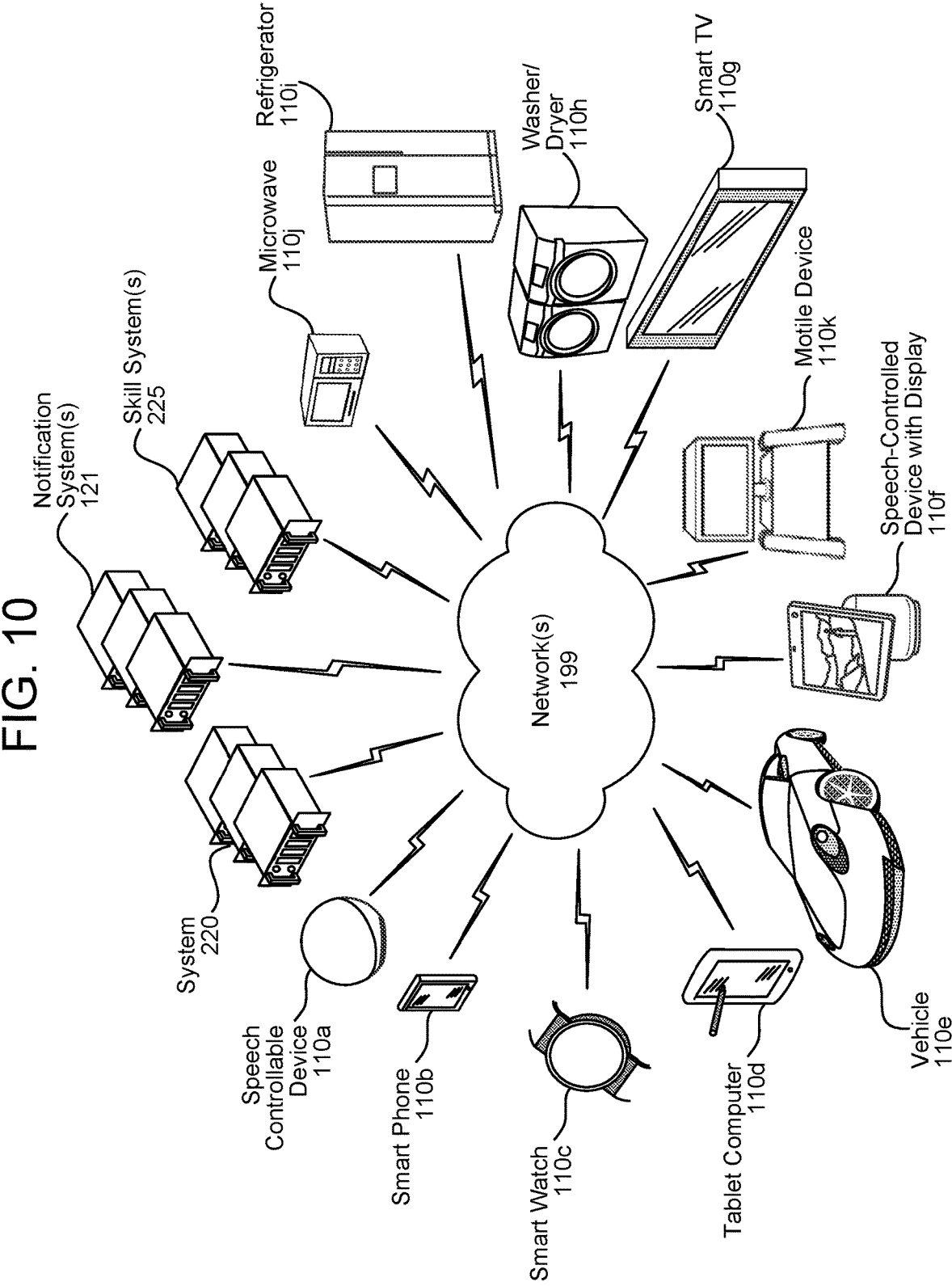

ACOUSTIC EVENT DETECTION

BACKGROUND

Computing devices may be configured to process sounds captured by a microphone and to take actions corresponding to the sound. The sounds may include non-speech events and/or human speech. An acoustic-event detector (AED) may be configured to recognize one or more non-speech sounds. A speech-processing system may allow a user to control computing devices using their speech. These systems identify words spoken by a user based on properties of received audio data that represents the speech of the user. Automatic speech-recognition (ASR) processing combined with natural-language understanding (NLU) processing allows a speech-processing system to determine text or other type of data corresponding to the speech and to understand an intent expressed in the speech. Acoustic-event detection and/or speech processing may be used by computers, handheld devices, smart speakers, and other devices to improve human-computer interactions.

BRIEF DESCRIPTION OF DRAWINGS

For a more complete understanding of the present disclosure, reference is now made to the following description taken in conjunction with the accompanying drawings.

FIGS. 6A, 6B, and 6C illustrate methods of using AED components according to embodiments of the present disclosure.

FIG. 10 illustrates an example of a computer network for use with the overall system, according to embodiments of the present disclosure.

DETAILED DESCRIPTION

Figure 1:
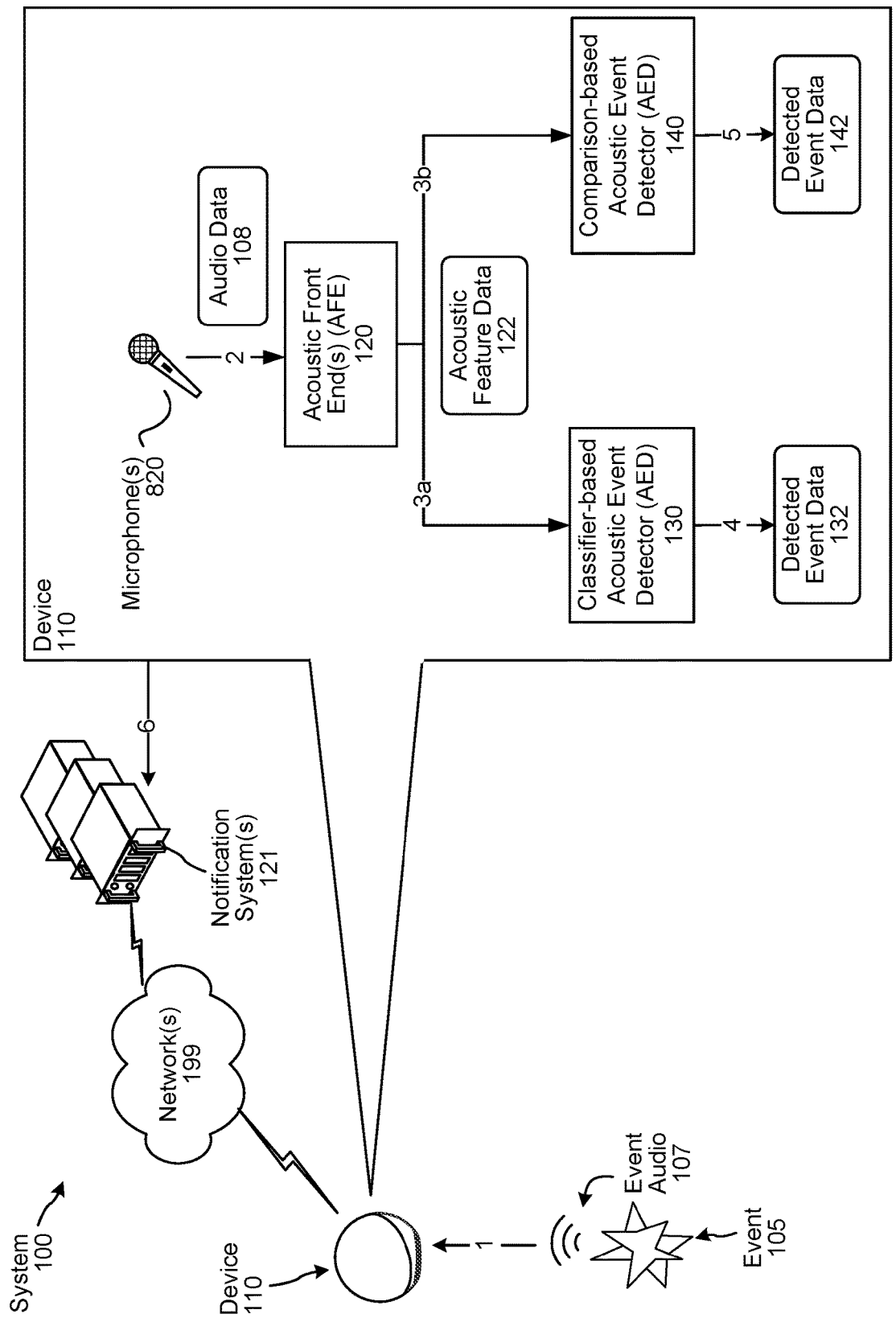
FIG. 1 illustrates a system configured to detect an acoustic event using two acoustic event detectors according to embodiments of the present disclosure.

Acoustic-event detection is a field of computer science and artificial intelligence that relates to processing audio data representing a sound, such as a non-speech sound, to determine when and if a particular acoustic event is represented in the audio data. Automatic-speech recognition (ASR) is a field of computer science, artificial intelligence, and linguistics that relates to transforming audio data representing speech into text data representing that speech. Natural-language understanding (NLU) is a field of computer science, artificial intelligence, and linguistics that relates to enabling computers to derive meaning from the text data. Text-to-speech (TTS) is a field of computer science, artificial intelligence, and linguistics that relates to enabling computers to convert a representation of text into audio representing synthesized speech. ASR and/or NLU may be used together as part of a natural language processing system. In other embodiments, systems may use spoken language understanding (SLU) techniques that processes audio data representing speech and determines meaning of the speech. A system may also be capable of acoustic event detection (AED), that is detecting events that have one or more distinctive sounds that allow the system to determine when they occur. Examples of such events may include glass breaking, a baby crying, or other events. A system capable of performing speech processing may also be capable of performing AED. In various embodiments, the natural language processing system may process data associated with an acoustic event (e.g., audio data that includes a representation of the event and/or event data generated by the AED system) and/or speech data associated with the event and may determine a corresponding output (e.g., sending a notification to a user device).

A device and/or a system may be configured to process audio data to determine if properties of the audio data correspond to properties associated with an acoustic event. Other examples of acoustic events include a doorbell ringing, a microwave oven beeping, a dog barking, a window pane breaking, and/or a door closing. The device may process the audio data in groups of samples, known as frames of audio data, to extract audio features from the audio data as it is received. The audio features may include, for example, log Mel-filterbank energy features corresponding to the audio data frames. An acoustic event detector (AED) component may process the audio features.

A voice-controlled device and/or a system may be configured to receive a spoken user input and detect a wakeword and/or other text in the user input; determine a command in the user input; and provide a response to the command. A user may thus interact with the voice-controlled device, another device, and/or system by voice. In some embodiments, in response to the device detecting the wakeword, the user device may perform speech processing on audio data representing the speech of the user, and/or send the audio data to the system for processing. The system may further process the audio data to verify that it includes a representation of the wakeword and/or to determine the command and/or response. The device may then receive, from the system, output audio, video, or other data related to the response and/or other data required to perform an action associated with the response (e.g., a command to turn on a light).

An AED component may be trained, using training data representing various (non-speech) sounds, or otherwise be configured to detect a predetermined set of acoustic events. For example, the training data may include examples of various types of doorbells ringing, and if a device that includes the AED component detects an acoustic event that resembles one of the event types in the training data, the device may indicate detection of the event and optionally output a response, such as sending data indicating occurrence of the event to the device or another device, such as a user's smartphone.

A system may be able to detect a certain catalog of predetermined/preloaded sounds. The system may learn to detect such sounds based on predetermined training data including samples (e.g., audio samples) of the predetermined sounds. To detect the predetermined sounds, the system can include a robust processing pipeline for capturing audio, determining an encoded representation of the audio, and classifying the encoded representation of the audio to detect occurrence of one or more of the predetermined sounds. The user, however, may want the system to detect other sounds (e.g., a custom sound) than the predetermined sounds. The predetermined training data (for the robust processing pipeline) may, however, not include any or enough examples of different/other types of sounds, and may thus not be able to detect a custom sound that falls outside the scope of the predetermined sounds. The system needs to be flexible and configurable to detect the custom sound. For example, a user may configure a doorbell to play a custom sound when rung, such as a snippet from a particular song. A device corresponding to the user may thus not detect an acoustic event when it hears the custom doorbell, despite being able to detect acoustic events corresponding to other types of doorbells. Further, the user of the user device may wish to have the device/system be able to detect an acoustic event having a type (herein referred to as a "class") that a default AED component is not necessarily capable of detecting initially. For example, the device may be disposed in a kitchen, and the user may wish the device to detect the sound of a pot of water boiling over onto a stove. Still further, the user may wish the device to distinguish between similar acoustic events rather than perform a single action for multiple distinct events. For example, the user may have configure two doors, such as a front door and a side door, to have different types of doorbells and may wish that the AED component distinguish between, and take different actions based on, the different doorbell sounds.

The present disclosure relates to a unified acoustic event detection system that unifies reference-based custom acoustic event detection (AED) and classifier-based acoustic event detection (AED) into one system/device. The classifier-based AED processing can be the robust pipeline configured to detect a predetermined set of acoustic events. The reference-based AED processing can be configured to detect a custom set of acoustic events configured by a user. The classifier-based AED branch and the reference-based AED branch share the same audio intake and feature extraction process. The extracted feature is then fed to the classifier-based (predetermined) AED model/component (e.g., a first CRNN) and the reference-based (custom) AED model/component (e.g., a second CRNN), which are decoupled from each other, to allow independent and task-specific representation encoding.

Teachings of the present disclosure may be configured to incorporate user permissions and may only perform activities disclosed herein if approved by a user. These permissions may include a grant (or denial) to use a particular component/method. The systems, devices, components, and techniques described herein may thus be configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system configured to use two AED components for detecting occurrence of an acoustic event(s). Although the figures and discussion of the present disclosure illustrate certain operational steps of the system in a particular order, the steps described may be performed in a different order (as well as certain steps removed or added) without departing from the intent of the disclosure. In various embodiments, a device 110 communicates with a notification system 121 over a network(s) 199. The network(s) 199 may include the Internet and/or any other wide- or local-area network, and may include wired, wireless, and/or cellular network hardware. While FIG. 1 illustrates a smart speaker as the device 110, the disclosure is not limited thereto, and the systems and methods described herein may be implemented using other devices 110, such as smartphones, tablet computers, personal computers, or other example devices shown in FIG. 10.

The device 110 may capture (step 1) event audio 107 from an event 105 that may occur within an environment of the device 110, where the environment may be an area surrounding the device 110, and the device 110 is capable of "hearing"/capturing sounds occurring within the environment. In some embodiments, a second device 110b within a user's environment, such as, a user's home, a user's office, a user's vehicle, a hotel/office lobby, a retail store, etc. may capture the event audio 107 from the event 105 that may occur within an environment surrounding the second device 110b. The second device 110b may send, over the network(s) 199, the event audio 107 to the device 110, shown in FIG. 1, for processing.

As shown in FIG. 1, the device 110 may include one or more microphone(s) 820 that detect audio and generate audio data 108. The audio data 108 may be provided (step 2) to one or more acoustic front ends (AFE) component 120 for processing. The AFE component 120 may be configured to process the audio data 108 and determine acoustic feature data 122. The AFE component 120 may process the audio data 108 using a number of techniques, such as determining frequency-domain representations of the audio data 108 by using a transform such as a Fast Fourier transform (FFT) and/or determining a Mel-cepstrum corresponding to the audio data 108. The acoustic feature data 122 may data corresponding to a representation of the audio data 108. The acoustic feature data 122 may include one or more acoustic feature vectors such as log filterbank energy values. Other types of acoustic feature vectors may be similarly created and used; for example, the acoustic feature data 122 may include Mel-frequency cepstrum coefficients (MFCCs).

The AFE component 120 may include an analysis filterbank that processes one or more frames of the audio data 108. The audio data 108 may be a digital representation of an analog audio signal, which may represent the event 105 and correspond to the event audio 107. In other cases, where the device 110 captures audio data representing speech from a user, the audio data 108 may be a digital representation of an analog audio signal, which may represent the spoken input from the user. The analysis filterbank may include hardware, software, and/or firmware for converting the time-domain representation of the audio data 108 into frequency-domain representation of the audio data 108. This conversion may be performed by implementing a Fourier transform algorithm, such as a fast Fourier transform (FFT) or discrete-time Fourier transform (DTFT). The analysis filterbank may further include two or more filters for separating the frequency range of the resultant frequency-domain audio data into two or more frequency ranges or bins. For example, the analysis filterbank may separate a frequency range of 20 Hz-20 kHz into 20 bins.

The AFE component 120 may include an energy estimation component, which may receive as input the frequency representation of the audio data 108, process the frequency representation to determine one or more values that represent an estimated energy of the frequency data, and output corresponding acoustic feature data for each audio frame. If M acoustic features are extracted, the acoustic feature data 122 may include one or more acoustic feature vectors of size M. The energy estimation component may include one or more filters that, given the frequency data, determine one or more magnitudes of audio energy for each bin of frequency data. These magnitudes may be represented by one or more integer and/or fixed-point values of the acoustic feature vector. The energy estimation component may determine the magnitudes by, for example, averaging the frequency data or performing a root-mean-square operation on the frequency data. The energy estimation component may, prior to processing the frequency data, convert the frequency data from a first frequency format (e.g., Hertz) to a second frequency format (e.g., Mel). The energy estimation component may then perform a logarithm operation to determine the log-filterbank energies (LFBEs) of each bin. The acoustic feature data 122 may thus include one or more LFBE vectors. In other embodiments, the energy estimation component may perform a linear cosine transform on the logarithm of the frequency data to determine Mel-frequency cepstrum coefficients (MFCC), which may instead or additionally be represented by the acoustic feature data 122. The dimension of each acoustic feature vector of the acoustic feature data may correspond to the number M of frequency bins.

In some embodiments, the AFE component 120 may process the audio data 108 as it is received/captured by the device 110 (i.e. in a streaming manner). As such, in some cases the audio data 108 may represent a portion of the event audio 107, and may not correspond to the entire event 105. For example, the event 105 may be a sound generated by an appliance, such as a beeping sound generated by a microwave, which may occur for 15 seconds. The device 110 may capture the corresponding event audio 107, and may generate the audio data 108 in 1-second increments/portions. In such cases, the acoustic feature data 122 may correspond to the 1-second portion of the event audio 107.

In some embodiments, the AFE component 120 may process a portion/a set of frames of the audio data 108 at a time. For example, the AFE component 120 may perform windowing functions on the audio data 108 to create audio frames. The size of each audio frame may depend upon system configuration. In an example embodiment, each audio frame may include 25 milliseconds of the audio data 108, with an overlap of the next audio frame of 10 milliseconds of data, thus resulting in sliding window processing of the audio data 108. Performing a windowing function may include multiplying a time record by a finite-length window with an amplitude that varies smoothly and gradually toward zero at its edges. By performing such functions, the endpoints of the waveforms of respective frames of audio data meet, resulting in a continuous waveform without sharp transitions. The AFE component 120 may then perform further processing (e.g., FFT) that generates, from the waveforms in each audio frame, a corresponding acoustic feature vector included in the acoustic feature data 122.

Figure 2:
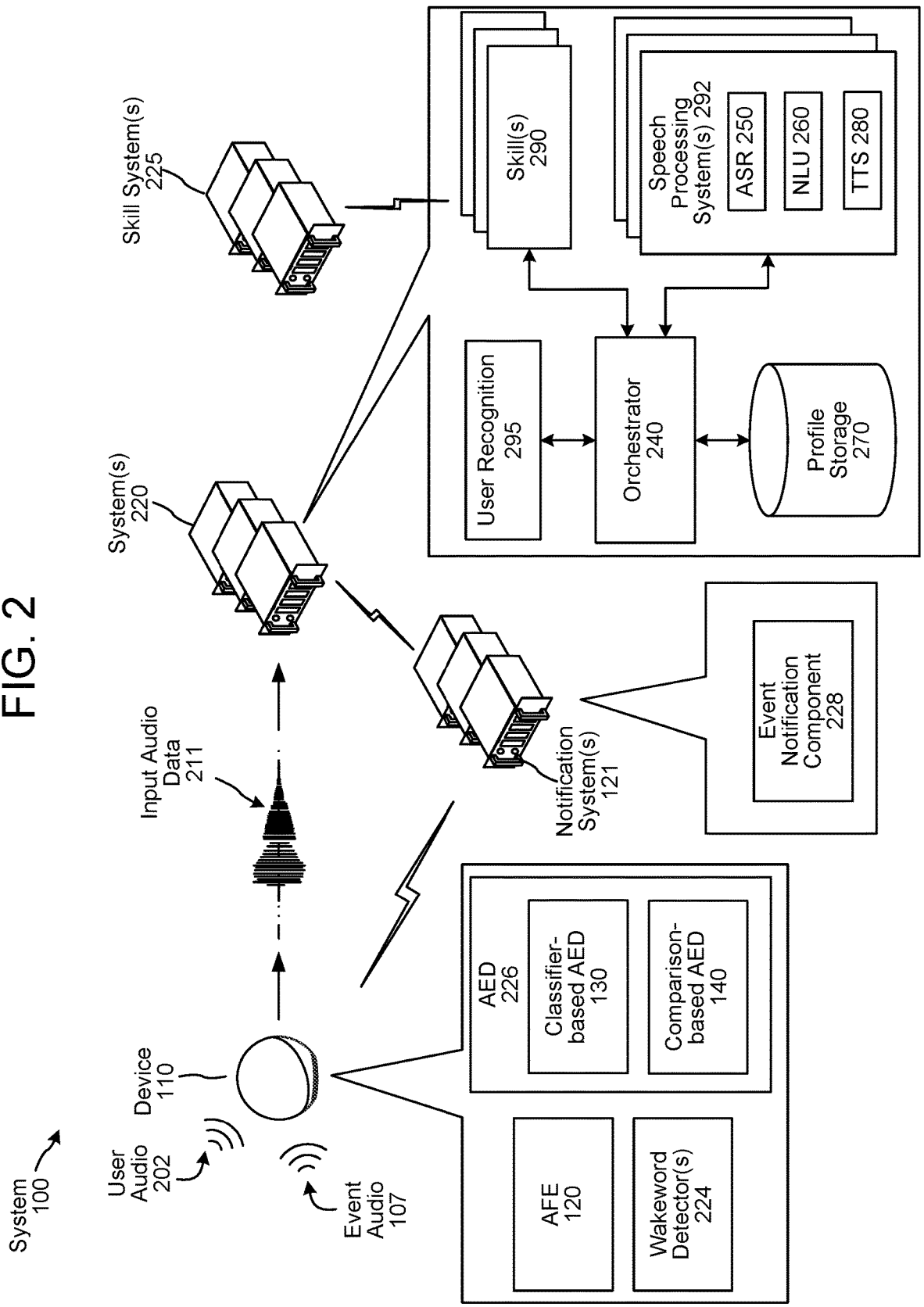
FIG. 2 illustrates a device, a system configured for detecting an acoustic event and a system for speech processing according to embodiments of the present disclosure.

In some embodiments, the device 110 may include one AFE component 120 that may process the audio data 108 to generate the acoustic feature data 122 to be used by the AED components 130, 140, and another AFE component 120 that may process the audio data 108 to generate acoustic feature data to be used by a wakeword detector 224 (shown in FIG. 2). In other embodiments, the device 110 may include one AFE component 120 that may generate acoustic feature data to be used by the classifier-based AED component 130, and another AFE component 120 that may generate acoustic feature data to be used by the comparison-based AED component 140. In other embodiments, the AFE component 120 may generate the acoustic feature data 122 which may be used by the classifier-based AED component 130, the comparison-based AED component 140 and the wakeword detector 224. The AED components 130 and 140 may also receive other data, which may include, for example, time data, image data, sensor data from other sensors in an environment, sensor data from a sensor(s) of the device 110, or the like. Such other data may be used by the AED component 130, 140 to determine whether a particular event occurred.

The AFE component 120 may provide (step 3a) the acoustic feature data 122 to the classifier-based (first) AED component 130, and in parallel (at substantially the same time) may provide (step 3b) the acoustic feature data 122 to the comparison-based (second) AED component 140. In this manner, the first and second AED components 130, 140 may process the acoustic feature data 122 at substantially the same time/in parallel.

In some embodiments, the classifier-based AED component 130 may be configured to detect a predetermined set of acoustic events. An example of the predetermined set of acoustic events may be glass breaking, human activity sounds (e.g., footsteps, door closing, talking, etc.), dog barking, and fire/smoke alarm. Such predetermined set of acoustic events may relate to detecting an intruder or unsafe conditions within the device's 110 environment. The classifier-based AED component 130 may be configured to detect other example acoustic events. The acoustic events that the classifier-based AED component 130 is configured to detect may be referred to herein as predetermined acoustic events.

In some embodiments, the comparison-based AED component 140 may be configured to detect one or more acoustic events specified by a user of the device 110. The acoustic events that the comparison-based AED component 140 is configured to detect may be referred to herein as custom acoustic events. As described herein in relation to FIG. 5, a user 505 may "teach" the device 110 to detect one or more custom acoustic events. Such custom acoustic events may relate to a certain type/brand of appliance within the user's home, a certain type of pet, a certain type of doorbell, a certain type of alert/sound made by a car, or other devices configured to generate customized sounds, a certain type of human activity, and the like. For example, the user 505 may configure the device 110 to detect chirping/speaking by a pet bird. As another example, the user 505 may configure the device 110 to detect a custom doorbell sound. As yet another example, the user 505 may configure the device 110 to detect a person walking with a cane. As yet another example, the user 505 may configure the device 110 (which may be located within a car) to detect a sound made by a car (e.g., a first type of beeping by a certain car model may mean that the tire pressure is low, a second type of noise may mean that maintenance is due, etc.). The comparison-based AED component 140 may be configured to detect such custom acoustic events.

Since the classifier-based AED component 130 is configured to detect a predetermined set of acoustic events, while the comparison-based AED component 140 is configured to detect a larger range of custom acoustic events, one or more machine learning models/components implemented by the classifier-based AED component 130 may be smaller (e.g., in terms of the memory/data size, amount of computing resources used, amount of time needed to process, etc.) than the machine learning model(s)/component(s) implemented by the comparison-based AED component 140. Further details of the models/components of the AED components 130, 140 is described below in relation to FIG. 4.

In some regards, the classifier-based AED component 130 may be already trained/configured to detect a set of acoustic events, and may thus be a complete model in and of itself that can detect when an acoustic event from the set occurs. As compared to the classifier-based AED component 130, the comparison-based AED component 140 may not be stand-alone model, but rather needs a reference vector(s), such as custom event profile data 482 described below, for any number of custom sounds that a user may configure/ enable to determine when a custom sound occurs. In other words, in order to operate, the classifier-based AED component 130 can only use the input audio data, while the comparison-based AED component 140 uses the input audio data and the custom event profile data 482.

The classifier-based AED component 130 may process the acoustic feature data 122, and may output (step 4) detected event data 132. The classifier-based AED component 130 may process the acoustic feature data 122 to determine whether the audio data 108 corresponds to one or more of the predetermined acoustic events. For example, the classifier-based AED component 130 may determine whether the acoustic feature data 122 includes features that indicate features similar or same to one or more of the predetermined acoustic events. The detected event data 132 may be an indication (e.g., a label, an event identifier, etc.) of the acoustic event represented in the audio data 108. For example, the detected event data 132 may be data indicating that a glass breaking event occurred. In some cases, the event audio 107 may represent more than one event occurrence, and the detected event data 132 may indicate that more than one of the predetermined acoustic events occurred. For example, the detected event data 132 may be data indicating that a glass break event and a human activity event (e.g., talking) occurred. If the audio data 108 does not correspond to any of the predetermined acoustic events, then the detected event data 132 may be null, may indicate "other" or the like.

The comparison-based AED component 140 may process the acoustic feature data 122, and may output (step 5) detected event data 142. The comparison-based AED component 140 may process the acoustic feature data 122 to determine whether the audio data 108 corresponds to one or more of the custom acoustic events. For example, the comparison-based AED component 140 may determine whether the acoustic feature data 122 includes features that indicate features similar or same to one or more of the custom acoustic events that the user 505 configured the device 110 to detect. The detected event data 142 may be an indication (e.g., a label, an event identifier, etc.) of the acoustic event represented in the audio data 108. For example, the detected event data 142 may be data indicating that a doorbell event occurred. In some cases, the event audio 107 may represent more than one event occurrence, and the detected event data 142 may indicate that more than one of the custom acoustic events occurred. For example, the detected event data 142 may be data indicating that a doorbell event and a pet sound event occurred. If the audio data 108 does not correspond to any of the custom acoustic events, then the detected event data 142 may be null, may indicate "other" or the like.

In some cases, a predetermined acoustic event and a custom acoustic event may be represented in the audio data 108. In such cases, both of the detected event data 132 and 142 may include data indicating the appropriate event occurrences.

In some embodiments, each of the detected event data 132, 142 may correspond to a portion of the audio data 108, for example, a set of audio frames that are processed by the AED components 130, 140. The device 110 may include an event detection component that may aggregate the results (e.g., detected event data) of the AED components 130, 140 processing sets of audio frames of the audio data 108 corresponding to the event 105. The event detection component may perform further processing on the aggregated results/detected event data to determine an acoustic event represented in the audio data 108. Such further processing may involve normalizing, smoothing, and/or filtering of the results/detected event data.

The device 110 may send (step 6) the detected event data 132, 142 to the notification system(s) 121. The notification system(s) 121 may generate notification data 756 (shown in FIG. 7) based on the detected event data 132, 142. The notification system(s) 121 may send the notification data 756 to one or more devices 110 associated with the user 505. Further details regarding the notification output are described below in relation to FIG. 7.

Upon detection of an acoustic event, the device 110 may cause a notification of an acoustic event to be sent. For example, the device 110 may cause output (via the notification system(s) 121) of corresponding output data, such as sending an alert/notification to a second user device, sending a message/alert to emergency services, and/or opening a door.

In some embodiments, the models/components of the AED components 130, 140 are configured after applying quantization techniques. Quantization is the process of transforming deep learning models to use parameters and computations at a lower precision. Some quantization techniques may involve a process of approximating a neural network that uses floating-point numbers by a neural network of low bit width numbers. Such techniques may reduce both the memory requirement and computational cost of using neural networks.

In some embodiments, the models/components of the AED components 130, 140 employ streaming models. The system/device may are acquire data (e.g., audio data) sequentially over time. Rather than wait for the data to be collected, streaming models start processing the data as it is received to begin identifying patterns, making decisions, etc. as data is received.

In some embodiments, the AED components 130, 140 may only operate when audio energy/volume (or other audio features) corresponding to the event audio 107 reaches a certain level (e.g., threshold, condition, etc.) so as to conserve (device 110) energy. In other words, the AED components 130, 140 may not run/process constantly, but rather may only run/process once the audio volume (or other audio features) satisfies a certain condition.

In some embodiments, the device 110 may be configured to process audio data to detect custom acoustic events when a certain condition is satisfied. Such condition may relate to a time period, occurrence of another event, etc. For example, a user may configure the device 110 to detect a custom acoustic event, like a front door opening, only between 10 pm and 6 am. As another example, a user may configure the device 110 to detect the front door opening all times other than 2-6 pm (e.g., when most people in the household would be arriving home). As another example, a user may configure the device 110 to detect opening of a backdoor when presence of a person is detected (e.g., using image data, motion sensor data, etc.) in the yard.

Please make sure spec supports the custom events may only be enabled during certain times. For example, if I have a custom event for my front door opening I may want the system to let me know if that happens between 10 pm and 6 am but I don't need a reminder from 2-6 pm when all the kids are coming and going from the house all the time.

The system 100 may operate using various components as described in FIG. 2. The various components may be located on same or different physical devices. For example, as shown in FIG. 2, some components may be disposed on a device 110, while other components may be disposed on a system 220; however, some or all of the components may be disposed on the device 110. Communication between various components may thus occur directly (via, e.g., a bus connection) or across the network(s) 199. As described above, the device 110 may include the AFE component 120, the classifier-based AED component 130, and the comparison-based AED component 140. The classifier-based AED component 130 and the comparison-based AED component 140 may be included in an AED component 226, which may be configured to perform different types of acoustic event detections, such as, for example, detection of prebuilt sounds and detection of custom sounds taught by a user of the device 110.

The device 110 may also include one or more wakeword detectors 224 for detecting one or more wakewords for providing output and/or changing a state of the device 110, such as illuminating a light, activating a display screen, etc. As illustrated, the wakeword detector 224 is disposed on the device 110, while further speech-processing components are disposed on the system 220. The present disclosure is not, however, limited to only this arrangement of components, and any other disposition of components is within the embodiments of the present disclosure. For example, some or all of the speech processing may be performed by the device 110, and the device 110 may thus not send any audio data 211 to the system 220.

An audio capture component(s), such as a microphone or array of microphones of the device 110, captures input audio, such as the event audio 107 and/or user audio 202 (e.g., speech/spoken inputs from a user(s)) and creates corresponding input audio data 211.

The AED component 226 may receive audio data from a microphone or microphone array; this audio data may be a digital representation of an analog audio signal and may be sampled at, for example, 256 kHz. The AED component 226 may instead or in addition receive acoustic feature data 122, which may include one or more LFBE and/or MFCC vectors, from the AFE component 120 as described above. The AFE component 120 for the AED component 226 may differ from the AFE component 120 for the wakeword detector 224 at least because the AED component 226 may require a context window greater in size (or smaller in size) than that of the wakeword detector 224. For example, the wakeword acoustic-feature data may correspond to one second of audio data, while the AED acoustic-feature data may correspond to ten seconds of audio data.

The device 110 may instead or in addition process the input audio data 211 to determine whether speech is represented therein. The device 110 may use various techniques to determine whether the input audio data 211 includes speech. In some examples, a voice-activity detector of the device 110 may apply voice-activity detection (VAD) techniques. Such VAD techniques may determine whether speech is present in audio data based on various quantitative aspects of the input audio data 211, such as the spectral slope between one or more frames of the audio data; the energy levels of the audio data in one or more spectral bands; the signal-to-noise ratios of the audio data in one or more spectral bands; or other quantitative or qualitative aspects. In other examples, the device 110 may include a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The wakeword detector(s) 224 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detector 224 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once a wakeword is detected by the wakeword detector(s) 224, the device 110 may begin transmitting the audio data 211 to the system 220. The input audio data 211 may include data corresponding to the wakeword; in other embodiments, the portion of the audio corresponding to the wakeword is removed by the device 110 prior to sending the input audio data 211 to the system 220. In the case of touch input detection, for example, the input audio data 211 may not include a wakeword.

In various embodiments, the wakeword detector(s) 224 may use one of a plurality of wakeword-detection models. Each model may be trained to detect a different wakeword. In some embodiments, a single model may detect multiple wakewords. Each wakeword may be associated with a different speech-processing system. Upon detection of a particular wakeword, the device 110 may send the audio data 211 (and/or an indication of detection of the wakeword) to its corresponding speech-processing system.

In various embodiments, the wakeword-detection model of the wakeword detector(s) 224 is implemented to detect wakewords spoken in different accents corresponding to different countries, regions, or other areas. For example, the wakeword-detection model may be implemented to detect the wakeword "Alexa" whether it is spoken in an Indian, Scottish, or Australian accent. The wakeword-detection model may be also implemented to detect other wakewords in other languages; these other languages may have similar variations in accents that the wakeword-detection model may be similarly implemented to detect.

The wakeword detector(s) 224 may determine a similarity score for the candidate wakeword based on how similar it is to the stored wakeword; if the similarly score is higher than the wakeword-detection threshold, the wakeword detector 224 determines that the wakeword is present in the audio data, and if the similarity score is less than the wakeword-detection threshold, the wakeword detector 224 determines that the wakeword not is present in the audio data. For example, if the candidate wakeword matches the stored wakeword very closely, the wakeword detector 224 may determine a similarity score of 100; if the candidate wakeword does not match the stored wakeword at all, the wakeword detector 224 may determine a similarity score of 0. If the wakeword detector 224 determines candidate wakeword partially matches the stored wakeword, it may determine an intermediate similarity score, such as 75 or 85. Though the disclosure herein describes a similarity score of 0-100, wherein zero is least similar and 100 is most similar. The present disclosure is not limited to any particular range of values of the similarity score, and any system or method of determining similarity between a candidate wakeword represented in captured audio data and a stored representation of the wakeword is within the scope of the present disclosure.

Upon receipt by the system 220 and/or upon determination by the device 110, the input audio data 211 may be sent to an orchestrator component 240. The orchestrator component 240 may include memory and logic that enables it to transmit various pieces and forms of data to various components of the system, as well as perform other operations as described herein. The orchestrator component 240 may be or include a speech-processing system manager and/or one or more of the speech-processing systems 292, which may be used to determine which, if any, of the ASR component 250, NLU component 260, and/or TTS component 280 should receive and/or process the audio data 211. In some embodiments, the orchestrator component 240 includes one or more ASR components 250, NLU components 260, TTS components 280, and/or other processing components, and processes the input audio data 211 before sending it and/or other data to one or more speech-processing components 292 for further processing. In other embodiments, the orchestrator component 240 sends the input audio data 211 to one or more of the speech-processing components 292 for processing.

In some embodiments, the orchestrator 240 and/or speech-processing system manager communicate with the speech-processing systems 292 using an application programming interface (API). The API may be used to send and/or receive data, commands, or other information to and/or from the speech-processing systems 292. For example, the orchestrator 240 may send, via the API, the input audio data 211 to a speech-processing systems elected by the speech-processing system manager and may receive, from the selected speech-processing system 292, a command and/or data responsive to the audio data 211.

Each speech-processing system 292 may include an ASR component 250, which may transcribe the input audio data 211 into text data. The text data output by the ASR component 250 may represent one or more than one (e.g., in the form of an N-best list) ASR hypotheses representing speech represented in the input audio data 211. The ASR component 250 may interpret the speech in the input audio data 211 based on a similarity between the audio data 211 and pre-established language models. For example, the ASR component 250 may compare the input audio data 211 with models for sounds (e.g., acoustic units such as phonemes, senons, phones, etc.) and sequences of sounds to identify words that match the sequence of sounds of the speech represented in the input audio data 211. The ASR component 250 sends ASR data generated thereby to an NLU component 260, via, in some embodiments, the orchestrator component 240. The ASR data sent from the ASR component 250 to the NLU component 260 may include a single top-scoring ASR hypothesis or may include an N-best list including multiple ASR hypotheses. An N-best list may additionally include a respective score associated with each ASR hypothesis represented therein. An ASR hypothesis may include text data or token data (e.g., sub-word representations) corresponding to the words recognized from the audio data 211.

Each speech-processing system 292 may further include a NLU component 260 that determines a semantic interpretation of the word(s) or phrase(s) represented in the ASR data by determining one or more meanings associated with the word(s) or phrase(s) represented in the ASR data. The NLU component 260 may determine an intent representing an action that a user desires be performed and may determine information that allows a device (e.g., the device 110, the system 220, a skill component 290, a skill system(s) 225, etc.) to execute the intent. For example, if the ASR data corresponds to "play [song] by [artist]," the NLU component 260 may determine an intent that the system output music and may identify the indicated artist and the indicated song. For further example, if the ASR data corresponds to "what is the weather," the NLU component 260 may determine an intent that the system output weather information associated with a geographic location of the device 110. In another example, if the ASR data corresponds to "turn off the lights," the NLU component 260 may determine an intent that the system turn off lights associated with the device 110 or the user from whom the user audio data 202 is received.

The orchestrator component 240 may send text data or ASR output data output, depending on the type of natural language user input received, to a NLU component 260. The NLU component 260 processes the ASR output data or text data to determine one or more NLU hypotheses embodied in NLU output data. The NLU component 260 may perform intent classification (IC) processing on the ASR output data or text data to determine an intent of the natural language user input. An intent corresponds to an action to be performed that is responsive to the natural language user input. To perform IC processing, the NLU component 260 may communicate with a database of words linked to intents. For example, a music intent database may link words and phrases such as "quiet," "volume off," and "mute" to a <Mute> intent. The NLU component 260 identifies potential intents by comparing words and phrases in ASR output data or text data to the words and phrases in an intents database. In at least some embodiments, the NLU component 260 may communicate with multiple intents databases, with each intents database corresponding to one or more intents associated with a particular skill.

For example, IC processing of the natural language user input "play my workout playlist" may determine an intent of <PlayMusic>. For further example, IC processing of the natural language user input "call mom" may determine an intent of <Call>. In another example, IC processing of the natural language user input "call mom using video" may determine an intent of <VideoCall>. In yet another example, IC processing of the natural language user input "what is today's weather" may determine an intent of <OutputWeather>.

The NLU component 260 may also perform named entity recognition (NER) processing on the ASR output data or text data to determine one or more portions (which may be referred to as one or more slots) of the natural language user input that may be needed for post-NLU processing (e.g., processing performed by a skill). For example, NER processing of the natural language user input "play [song name]" may determine a slot corresponding to "SongName: [song name]." For further example, NER processing of the natural language user input "call mom" may determine a slot corresponding to "Recipient: Mom." In another example, NER processing of the natural language user input "what is today's weather" may determine a slot corresponding to "Date: Today."

In at least some embodiments, the intents identifiable by the NLU component 260 may be linked to one or more grammar frameworks with "slots" to be filled. Each slot of a grammar framework corresponds to a portion of ASR output data or text data that the NLU component 260 believes corresponds to an entity. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 260 may perform NER processing to identify words in ASR output data or text data as subject, object, verb, preposition, etc. based on grammar rules and/or models. Then, the NLU component 260 may perform IC processing that involves using the identified verb to identify an intent. Thereafter, the NLU component 260 may again perform NER processing to determine a grammar model associated with the identified intent. For example, a grammar model for a <PlayMusic> intent may specify a list of slots applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRF), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 260 may generate NLU output data including one or more NLU hypotheses, with each NLU hypothesis including the intent and slot(s) determined from IC processing and NER processing of the ASR output data or text data. In at least some embodiments, the NLU component 260 may perform IC processing and NLU processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 220 may perform speech processing using two different components (e.g., the ASR component 250 and the NLU component 260). In at least some embodiments, the system 220 may implement a spoken language understanding (SLU) component configured to process audio data 211 to determine NLU output data. The SLU component may be equivalent to a combination of the ASR component 250 and the NLU component 260. Yet, the SLU component may process audio data 211 and directly determine the NLU output data, without an intermediate step of generating ASR output data. As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user in order to derive a desired action. The SLU component may output a most likely NLU hypothesis, or multiple NLU hypotheses associated with respective confidence or other scores (such as probability scores, etc.).

The NLU component 260 (or the SLU component depending on configuration of the system 220) may send the NLU output data to the orchestrator component 240. The orchestrator component 240 may send the top-scoring NLU hypothesis (in the NLU output data) to a skill associated with the NLU hypothesis.

The NLU results data may be sent (via, for example, the orchestrator component 240) from the NLU component 260 (which may include tagged text data, indicators of intent, etc.) to a skill component(s) 290. If the NLU results data includes a single NLU hypothesis, the NLU component 260 may send the NLU results data to the skill component(s) 290 associated with the NLU hypothesis. If the NLU results data includes an N-best list of NLU hypotheses, the NLU component 260 may send the top scoring NLU hypothesis to a skill component(s) 290 associated with the top scoring NLU hypothesis. As described above, the NLU component 260 and/or skill component 290 may determine, using the interaction score, text data representing an indication of a handoff from one speech-processing system 292 to another.

A skill component 290 may be software running on the system 220 that is, or is similar to, a software application. A skill component 290 may enable the system 220 to execute specific functionality in order to provide data or produce some other requested output. The system 220 may be configured with more than one skill component 290. For example, a weather service skill component may enable the system 220 to provide weather information, a car service skill component may enable the system 220 to book a trip with respect to a taxi or ride sharing service, a restaurant skill component may enable the system 220 to order a pizza with respect to the restaurant's online ordering system, etc. A skill component 290 may operate in conjunction between the system 220 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

A skill system(s) 225 may communicate with a skill component(s) 290 within the system 220 directly and/or via the orchestrator component 240. A skill system(s) 225 may be configured to perform one or more actions. A skill may enable a skill system(s) 225 to execute specific functionality in order to provide data or perform some other action requested by a user. For example, a weather service skill may enable a skill service(s) 225 to provide weather information to the system 220, a car service skill may enable a skill system(s) 225 to book a trip with respect to a taxi or ride sharing service, an order pizza skill may enable a skill system(s) 225 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill. The system 220 may include a skill component 290 dedicated to interacting with the skill system(s) 225. A skill, skill device, or skill component may include a skill component 290 operated by the system 220 and/or skill operated by the skill system(s) 225.

The speech-processing system 292 may include a TTS component 280 that generates audio data (e.g., synthesized speech) from text data or other natural language representation data using one or more different methods. Data input to the TTS component 280 may come from a skill component 290, the orchestrator component 240, and/or another component of the system. The data may include an indication of a speech-processing component and/or data responsive to a command.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to determine audio data including an artificial speech waveform. Parametric synthesis uses a computerized voice generator, sometimes called a vocoder.

The system 220 may include a user-recognition component 295 that recognizes one or more users associated with data input to the system 220. The user-recognition component 295 may take as input the audio data 211 and/or ASR data output by the ASR component 250. The user-recognition component 295 may perform user recognition by comparing audio characteristics in the input audio data 211 to stored audio characteristics of users. The user-recognition component 295 may also perform user recognition by comparing biometric data (e.g., fingerprint data, iris data, etc.), received by the system in correlation with the present user input, to stored biometric data of users. The user-recognition component 295 may further perform user recognition by comparing image data (e.g., including a representation of at least a feature of a user), received by the system in correlation with the present user input, with stored image data including representations of features of different users. The user-recognition component 295 may perform additional user recognition processes, including those known in the art.

The user-recognition component 295 determines scores indicating whether user input originated from a particular user. For example, a first score may indicate a likelihood that the user input originated from a first user, a second score may indicate a likelihood that the user input originated from a second user, etc. The user-recognition component 295 also determines an overall confidence regarding the accuracy of user recognition operations.

Output of the user-recognition component 295 may include a single user identifier corresponding to the most likely user that originated the user input. Alternatively, output of the user-recognition component 295 may include an N-best list of user identifiers with respective scores indicating likelihoods of respective users originating the user input. The output of the user-recognition component 295 may be used to inform NLU processing as well as processing performed by other components of the system.

The system 220 may include profile storage 270. The profile storage 270 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information, as well as other information. The profile storage may store data corresponding to detection of an acoustic event; if, for example, the user 505 configures a device 110 after defining an acoustic event, data from the profile storage 270 corresponding to the event may be sent to the device 110.

The profile storage 270 may include one or more user profiles, with each user profile being associated with a different user identifier. Each user profile may include various user identifying information. Each user profile may also include preferences of the user and/or one or more device identifiers, representing one or more devices of the user. When a user logs into to an application installed on a device 110, the user profile (associated with the presented login information) may be updated to include information about the device 110. As described, the profile storage 270 may further include data that shows an interaction history of a user, including commands and times of receipt of commands. The profile storage 270 may further include data that shows when a second user was present to hear an indication of a handoff for a command uttered by a first user.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system 100 may include one or more notification system(s) 121 which may include an event notification component 228. Although illustrated as a separate system, notification system(s) 121 may be configured within system 220, device 110, or otherwise depending on system configuration. For example, event notification component 228 may be configured within system 220, device 110, or otherwise. The event notification component 228 may handle sending notifications/commands to other devices upon the occurrence of a detected acoustic event. The event notification component 228 may have access to information/instructions (for example as associated with profile storage 270 or otherwise) that indicate what device(s) are to be notified upon detection of an acoustic event, the preferences associated with those notifications or other information. The event notification component 228 may have access to information/instructions (for example as associated with profile storage 270 or otherwise) that indicate what device(s) are to perform what actions in response to detection of an acoustic event (for example locking a door, turning on/off lights, notifying emergency services, or the like. Further detail regarding the event notification component may be found below with regard to FIG. 7.

Figure 3:
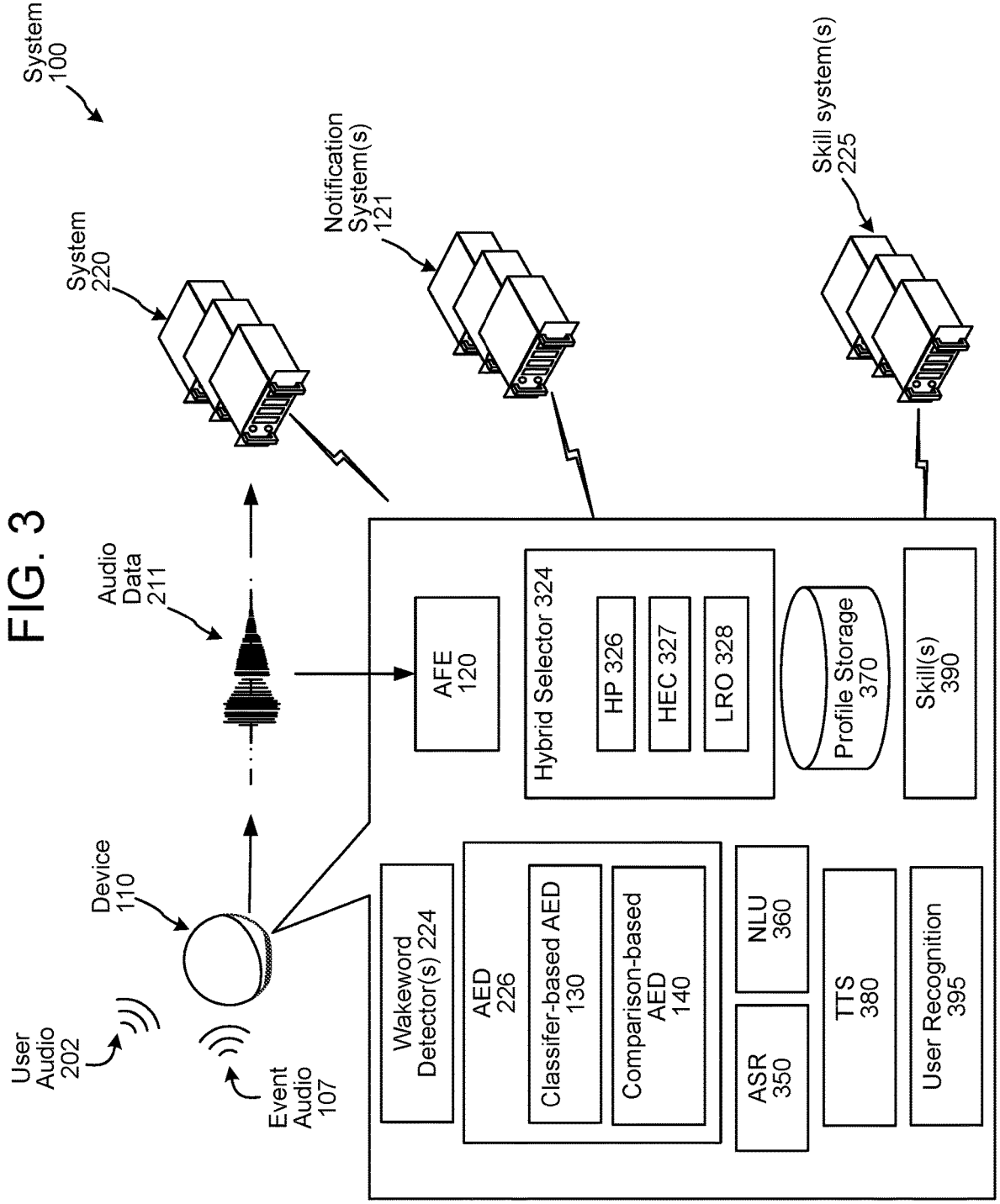
FIG. 3 is a conceptual diagram illustrating components that may be included in a device, according to embodiments of the present disclosure.

The foregoing describes illustrative components and processing of the system 220. The following describes illustrative components and processing of the device 110. As illustrated in FIG. 3, in at least some embodiments the system 220 may receive audio data 211 from the device 110, to recognize speech corresponding to a spoken natural language in the received audio data 211, and to perform functions in response to the recognized speech. In at least some embodiments, these functions involve sending directives (e.g., commands), from the system 220 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 220 over the network(s) 199, some or all of the functions capable of being performed by the system 220 may be performed by sending one or more directives over the network(s) 199 to the device 110, which, in turn, may process the directive(s) and perform one or more corresponding actions. For example, the system 220, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 220 may be configured to provide other functions in addition to those discussed herein, such as, without limitation, providing step-by-step directions for navigating from an origin location to a destination location, conducting an electronic commerce transaction on behalf of a user 505 as part of a shopping function, establishing a communication session (e.g., an audio or video call) between the user 505 and another user, and so on.

The wakeword detector(s) 224 may process the audio data 211 as described above, and may be configured to detect a wakeword (e.g., "Alexa") that indicates to the device 110 that the audio data 211 is to be processed for determining NLU output data. In at least some embodiments, a hybrid selector 324, of the device 110, may send the audio data 211 to the wakeword detector(s) 224. If the wakeword detector(s) 224 detects a wakeword in the audio data 211, the wakeword detector(s) 224 may send an indication of such detection to the hybrid selector 324. In response to receiving the indication, the hybrid selector 324 may send the audio data 211 to the system 220 and/or an on-device ASR component 350. The wakeword detector(s) 224 may also send an indication, to the hybrid selector 324, representing a wakeword was not detected. In response to receiving such an indication, the hybrid selector 324 may refrain from sending the audio data 211 to the system 220, and may prevent the on-device ASR component 350 from processing the audio data 211. In this situation, the audio data 211 can be discarded.

The device 110 may conduct its own speech processing using on-device language processing components (such as an on-device SLU component, an on-device ASR component 350, and/or an on-device NLU component 360) similar to the manner discussed above with respect to the speech processing system-implemented ASR component 250, and NLU component 260. The device 110 may also internally include, or otherwise have access to, other components such as one or more skills 390 (configured to process similar to the skills 290), a user recognition component 395 (configured to process in a similar manner to the speech processing system-implemented user recognition component 295), profile storage 370 (configured to store similar profile data to the speech processing system-implemented profile storage 270), a TTS component 380 (configured to process in a similar manner as the TTS component 280) and other components. In at least some embodiments, the on-device profile storage 370 may only store profile data for a user or group of users specifically associated with the device 110.

In at least some embodiments, the on-device language processing components may not have the same capabilities as the language processing components implemented by the system 220. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 220. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 220.

The hybrid selector 324, of the device 110, may include a hybrid proxy (HP) 326 configured to proxy traffic to/from the system 220. For example, the HP 326 may be configured to send messages to/from a hybrid execution controller (HEC) 327 of the hybrid selector 324. For example, command/directive data received from the system 220 can be sent to the HEC 327 using the HP 326. The HP 326 may also be configured to allow the audio data 211 to pass to the system 220 while also receiving (e.g., intercepting) this audio data 211 and sending the audio data 211 to the HEC 327.

In at least some embodiments, the hybrid selector 324 may further include a local request orchestrator (LRO) 328 configured to notify the on-device ASR component 350 about the availability of the audio data 211, and to otherwise initiate the operations of on-device language processing when the audio data 211 becomes available. In general, the hybrid selector 324 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 220 and chooses to use that remotely-determined directive data.

Thus, when the audio data 211 is received, the HP 326 may allow the audio data 211 to pass through to the system 220 and the HP 326 may also input the audio data 211 to the on-device ASR component 350 by routing the audio data 211 through the HEC 327 of the hybrid selector 324, whereby the LRO 328 notifies the on-device ASR component 350 of the audio data 211. At this point, the hybrid selector 324 may wait for response data from either or both the system 220 and/or the on-device language processing components. However, the disclosure is not limited thereto, and in some examples the hybrid selector 324 may send the audio data 211 only to the on-device ASR component 350 without departing from the disclosure. For example, the device 110 may process the audio data 211 on-device without sending the audio data 211 to the system 220.

The on-device ASR component 350 is configured to receive the audio data 211 from the hybrid selector 324, and to recognize speech in the audio data 211, and the on-device NLU component 360 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component 360) may be selected as usable to respond to a natural language input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language input, to use directive data received from the system 220, assuming a remote response is even received (e.g., when the device 110 is able to access the system 220 over the network(s) 199), or to determine output data requesting additional information from the user.

The device 110 and/or the system 220 may associate a unique identifier with each natural language input. The device 110 may include the unique identifier when sending the audio data 211 to the system 220, and the response data from the system 220 may include the unique identifier to identify to which natural language input the response data corresponds.

In at least some embodiments, the device 110 may include one or more skill components 390. The skill component(s) 390 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

Figure 4:
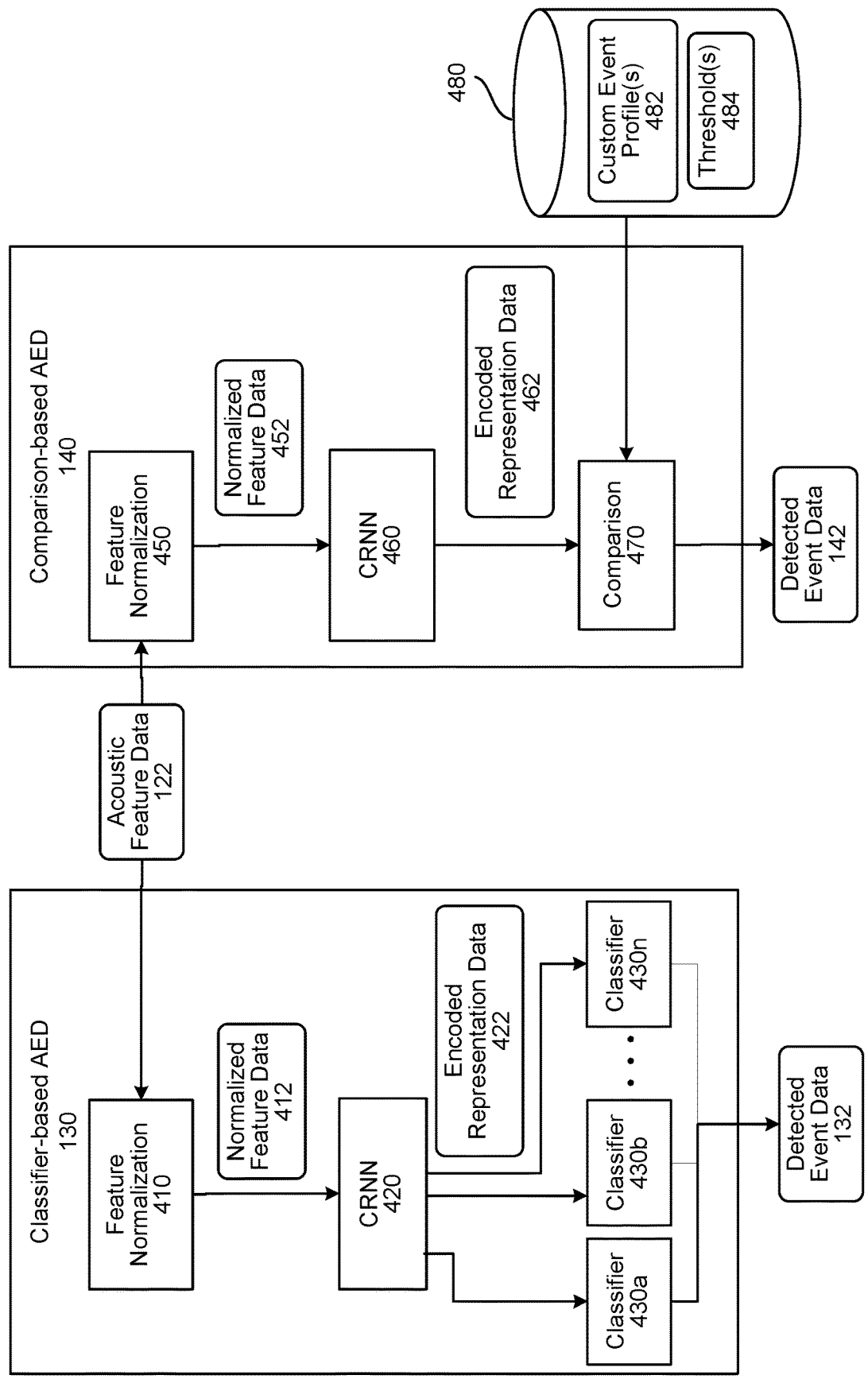
FIG. 4 illustrates components of a classifier-based acoustic event detector and a comparison-based acoustic event detector according to embodiments of the present disclosure.

FIG. 4 illustrates components of the classifier-based AED component 130 and the comparison-based AED component 140. As shown, the classifier-based AED component 130 may include a feature normalization component 410, a convolutional recurrent neural network (CRNN) 420, and one or more classifiers 430 (e.g., classifiers 430a-430n).

The feature normalization component 410 may process the acoustic feature data 122, and may perform some normalization techniques. Different environments (e.g., homes, offices, buildings, etc.) have different background noises and may also generate event audio at different levels, intensities, etc. The feature normalization component 410 may process the acoustic feature data 122 to remove, filter, or otherwise reduce the effect, of any environmental differences that may be captured by the device 110 in the audio data 108, on the processing performed by the CRNN 420 and the classifier(s) 430. The feature normalization component 410 may use a normalization matrix derived by performing statistical analysis on audio samples corresponding to the predetermined acoustic events. In some embodiments, the feature normalization component 410 may be configured with the CRNN 420 and/or using the same training data.

The CRNN 420 may be an encoder that generates encoded representation data 422 using the normalized feature data 412. The CRNN 420 may include one or more convolutional layers followed by one or more recurrent layer(s) that may process the normalized feature data 412 to determine one or more probabilities that the audio data includes one or more representations of one or more acoustic events. The CRNN 420 may include a number of nodes arranged in one or more layers. Each node may be a computational unit that has one or more weighted input connections, a transfer function that combines the inputs in some way, and an output connection. The CRNN 420 may include one or more recurrent nodes, such as LSTM nodes, or other recurrent nodes, such as gated rectified unit (GRU) noes. For example, the CRNN 420 may include 128 LSTM nodes; each LSTM node may receive one feature vector of the acoustic feature data during each frame. For next frames, the CRNN 420 may receive different sets of 128 feature vectors (which may have one or more feature vectors in common with previously-received sets of feature vectors—e.g., the sets may overlap). The CRNN 420 may periodically reset every, for example, 10 seconds. The CRNN 420 may be reset when a time of running the model (e.g., a span of time spent processing audio data) is greater than a threshold time. Resetting of the CRNN 420 may ensure that the CRNN 420 does not deviate from the state to which it had been trained. Resetting the CRNN 420 may include reading values for nodes of the model—e.g., weights—from a computer memory and writing the values to the recurrent layer(s).

The CRNN 420 may be trained using machine learning (ML) techniques and training data. The training data, for the CRNN 420, may include audio samples of the predetermined acoustic events (e.g., glass breaking, dog barking, human activity, and fire/smoke alarm) under different conditions (e.g., acoustic conditions, physical environment conditions like a large indoor area vs. a small indoor area, etc.). The training data may further include representations of other acoustic events and annotation data indicating which acoustic events are of interest and which acoustic events are not of interest. The CRNN 420 may be trained by processing the training data, evaluating the accuracy of its response against the annotation data, and updating the recurrent layer(s) via, for example, gradient descent. The CRNN 420 may be deemed trained when it is able to predict occurrence of acoustic events of interest in non-training data within a required accuracy.

The CRNN 420 may thus receive the acoustic-feature data and, based thereon, determine an AED probability, which may be one or more numbers indicating a likelihood that the acoustic-feature data represents the acoustic event. The AED probability may be, for example, a number that ranges from 0.0 to 1.0, wherein 0.0 represents a 0% chance that the acoustic-feature data represents the acoustic event, 1.0 represents a 100% chance that the acoustic-feature data represents the acoustic event, and numbers between 0.0 and 1.0 represent varying degrees of likelihood that the acoustic-feature data represents the acoustic event. A value of 0.75, for example, may correspond to 75% confidence in the acoustic-feature data including a representation of the acoustic event. The AED probability may further include a confidence value over time and may indicate at which times in the acoustic-feature data that the acoustic event is more or less likely to be represented.

A number of activation function components—one for each acoustic event—may be used to apply an activation function to the probability of occurrence of that event output by the recurrent layer(s). The activation function may transform the probability data such that probabilities near 50% are increased or decreased based on how far away from 50% they lie; probabilities closer to 0% or 100% may be affected less or even not at all. The activation function thus provides a mechanism to transform a broad spectrum of probabilities—which may be evenly distributed between 0% and 100%—into a binary distribution of probabilities, in which most probabilities lie closer to either 0% or 100%, which may aid classification of the probabilities as to either indicating an acoustic event or not indicating an acoustic event by an event classifier. In some embodiments, the activation function is a sigmoid function.

In some embodiments, the CRNN 420 may be configured to convert a higher dimensional feature vector (the normalized feature data 412) to a lower dimensional feature vector (the encoded representation data 422). The CRNN 420 may process multiple frames of acoustic feature data 122, represented in the normalized feature data 412, corresponding to an acoustic event and may ultimately output a single N-dimensional vector that uniquely identifies the event. That is, a first N-dimensional vector is first encoded representation data that represents a first predetermined acoustic event, a second N-dimensional vector is second encoded representation data that represents a second predetermined acoustic event, and so on. The N-dimensional vectors may correspond to points in an N-dimensional space known as an embedding space or feature space; in this space, data points that represent similar-sounding events are disposed closer to each other, while data points that represent different-sounding events are disposed further from each other. The CRNN 420 may be configured by processing training data representing a variety of events; if the CRNN 420 processes two items of audio data from two events known to be different, but maps them to similar points in the embedding space, the CRNN 420 is re-trained so that it maps the training data from the different events to different points in the embedding space. Similarly, if the CRNN 420 processes two items of audio data from two events known to be similar, but maps them to different points in the embedding space, the CRNN 420 is re-trained so that it maps the training data from the similar events to similar points in the embedding space.

The classifier(s) 430 may be a classifier trained to distinguish between the different predetermined acoustic events and other sounds that do not fall in the predetermined acoustic event class. Examples of trained classifiers include support-vector machines (SVMs), neural networks, decision trees, AdaBoost (short for "Adaptive Boosting") combined with decision trees, and random forests. For example, a SVM is a supervised learning model with associated learning algorithms that analyze data and recognize patterns in the data and may be used for classification and regression analysis. Given a set of training examples, each marked as belonging to one of two categories (e.g., acoustic event vs. non-acoustic event), an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Other examples of a classifier may be a neural network, a LSTM, etc. Classifiers may issue a "score" indicating which category the data most closely matches. The score may provide an indication of how closely the data matches the category.

The classifier(s) 430 may process the encoded representation data 422 corresponding to the event audio 107 and may determine the detected event data 132. The classifier(s) 430 may output one or more probabilities/scores representing a likelihood the event audio 107 corresponding to the predetermined acoustic events. Each of the classifiers 430 may be configured to detect occurrence of a different predetermined acoustic event, and may output a probability/score accordingly. For example, the classifier 430a may be configured to detect a first event type (e.g., glass breaking event), and may output a first probability/score representing a likelihood of the event audio 107 corresponding to the first event type. The classifier 430b may be configured to detect a second event type (e.g., dog barking event), and may output a second probability/score representing a likelihood of the event audio 107 corresponding to the second event type. The classifier 430n may be configured to detection a third (n-th) event type (e.g., human activity event), and may output a third probability/score representing a likelihood of the event audio 107 corresponding to the third event type. In some embodiments, each of the classifiers 430 may be a binary classifier.

In some embodiments, the classifier-based AED component 130 may use one classifier 430 configured to output multiple probabilities/scores, each representing a likelihood the event audio 107 corresponding to a respective predetermined acoustic event. For example, the single classifier 430 may output the vector {glass breaking event=0.7, dog barking event=0.8, human activity event=0.0, fire/smoke alarm event=0.0}. Alternatively or additionally, the classifier 430 may output one or more labels or indicators (e.g., a Boolean value such as 0/1 or yes/no, true/false, etc.) indicating which of the predetermined acoustic events corresponds to the event audio 107.

The detected event data 132 may be the probabilities, scores and/or labels outputted by the classifier(s) 430. The detected event data 132 may be a single value or a vector of values. The classifier-based AED component 130 may include further components, such as, filtering, ranking, etc. to process the probabilities/scores/labels outputted by the classifier(s) 430 and to determine the detected event data 132.

The classifier-based AED component 130 may output an indication of detection of a predetermined acoustic event as the detected event 132. Such detected event data 132 may include an identifier of the predetermined acoustic event, a score corresponding to the likelihood of the predetermined acoustic event occurring, or other related data. Such detected event data 132 may then be sent, over the network(s) 199, to a downstream component, for example notification system(s) 121/event notification component 228 or another device.

The comparison-based AED component may include a feature normalization component 450, a CRNN 460, and a comparison component 470. These components may be configured to detect custom acoustic events defined by a user(s) of the device 110.

The feature normalization component 450 may process the acoustic feature data 122 and may determine normalized feature data 452. The feature normalization component 450 may process the acoustic feature data 122, and may perform some normalization techniques. Different environments (e.g., homes, offices, buildings, etc.) have different background noises and may also generate event audio at different levels, intensities, etc. The feature normalization component 450 may process the acoustic feature data 122 to remove, filter, or otherwise reduce the effect, of any environmental differences that may be captured by the device 110 in the audio data 108, on the processing performed by the CRNN 460 and the comparison component 470. The feature normalization component 450 may use a normalization matrix derived by performing statistical analysis on audio samples corresponding to a wide range of acoustic events. In some embodiments, the feature normalization component 410 may be configured with the CRNN 460 and/or using the same training data.

The feature normalization component 450 may be different than the feature normalization component 410. In some regards, the feature normalization component 410 may apply normalization techniques in a more stringent manner for accurately detecting the predetermined acoustic events, whereas the feature normalization component 450 may apply normalization techniques in a less stringent manner so that a wide range of custom acoustic events can be detected.

The CRNN 460 may be an encoder that generates encoded representation data 462 using the normalized feature data 452. The CRNN 460 may include one or more convolutional layers followed by one or more recurrent layer(s) that may process the normalized feature data 452 to determine one or more probabilities that the audio data includes one or more representations of one or more acoustic events. The CRNN 460 may include a number of nodes arranged in one or more layers. Each node may be a computational unit that has one or more weighted input connections, a transfer function that combines the inputs in some way, and an output connection. The CRNN 460 may include one or more recurrent nodes, such as LSTM nodes, or other recurrent nodes, such as gated rectified unit (GRU) noes. For example, the CRNN 460 may include 128 LSTM nodes; each LSTM node may receive one feature vector of the acoustic feature data during each frame. For next frames, the CRNN 460 may receive different sets of 128 feature vectors (which may have one or more feature vectors in common with previously-received sets of feature vectors—e.g., the sets may overlap). The CRNN 460 may periodically reset every, for example, 10 seconds. The CRNN 460 may be reset when a time of running the model (e.g., a span of time spent processing audio data) is greater than a threshold time. Resetting of the CRNN 460 may ensure that the CRNN 460 does not deviate from the state to which it had been trained. Resetting the CRNN 460 may include reading values for nodes of the model—e.g., weights—from a computer memory and writing the values to the recurrent layer(s).

The CRNN 460 may be trained using ML techniques and training data. The training data, for the CRNN 460, may include audio samples of a wide variety of acoustic events (e.g., sounds from different types/brands of appliances, sounds of different types of pets, etc.). The training data may further include annotation data indicating which acoustic events are of interest and which acoustic events are not of interest. The CRNN 460 may be trained by processing the training data, evaluating the accuracy of its response against the annotation data, and updating the recurrent layer(s) via, for example, gradient descent. The CRNN 460 may be deemed trained when it is able to predict occurrence of acoustic events of interest in non-training data within a required accuracy.

The CRNN 420 may be configured to generate encoded representation data that accurately captures features that can be used to detect the predetermined acoustic events, whereas, the CRNN 460 may be configured to generate encoded representation data that can be used to detect a wider range of acoustic events, so that the CRNN 460 can be used to detect any custom acoustic event taught by the user 505. In some regards, the classifier-based AED component 130 may be more accurate in detecting the small number of predetermined acoustic events, whereas the comparison-based AED component 140 may be less accurate/precise but capable of detecting a large number of custom acoustic events. Such differences are built-in the AED components based on how the respective feature normalization components 410, 450 and the CRNNs 420, 460 are configured and trained.

The CRNN 460 may thus receive the acoustic-feature data and, based thereon, determine an AED probability, which may be one or more numbers indicating a likelihood that the acoustic-feature data represents the acoustic event. The AED probability may be, for example, a number that ranges from 0.0 to 1.0, wherein 0.0 represents a 0% chance that the acoustic-feature data represents the acoustic event, 1.0 represents a 100% chance that the acoustic-feature data represents the acoustic event, and numbers between 0.0 and 1.0 represent varying degrees of likelihood that the acoustic-feature data represents the acoustic event. A value of 0.75, for example, may correspond to 75% confidence in the acoustic-feature data including a representation of the acoustic event. The AED probability may further include a confidence value over time and may indicate at which times in the acoustic-feature data that the acoustic event is more or less likely to be represented.

A number of activation function components—one for each acoustic event—may be used to apply an activation function to the probability of occurrence of that event output by the recurrent layer(s). The activation function may transform the probability data such that probabilities near 50% are increased or decreased based on how far away from 50% they lie; probabilities closer to 0% or 100% may be affected less or even not at all. The activation function thus provides a mechanism to transform a broad spectrum of probabilities—which may be evenly distributed between 0% and 100%—into a binary distribution of probabilities, in which most probabilities lie closer to either 0% or 100%, which may aid classification of the probabilities as to either indicating an acoustic event or not indicating an acoustic event by an event classifier. In some embodiments, the activation function is a sigmoid function.

In some embodiments, the CRNN 460 may be configured to convert a higher dimensional feature vector (the normalized feature data 452) to a lower dimensional feature vector (the encoded representation data 462). The CRNN 460 may process multiple frames of acoustic feature data 122, represented in the normalized feature data 452, corresponding to an acoustic event and may ultimately output a single N-dimensional vector that uniquely identifies the event. That is, a first N-dimensional vector is first encoded representation data that represents a first predetermined acoustic event, a second N-dimensional vector is second encoded representation data that represents a second predetermined acoustic event, and so on. The N-dimensional vectors may correspond to points in an N-dimensional space known as an embedding space or feature space; in this space, data points that represent similar-sounding events are disposed closer to each other, while data points that represent different-sounding events are disposed further from each other. The CRNN 460 may be configured by processing training data representing a variety of events; if the CRNN 460 processes two items of audio data from two events known to be different, but maps them to similar points in the embedding space, the CRNN 460 is re-trained so that it maps the training data from the different events to different points in the embedding space. Similarly, if the CRNN 460 processes two items of audio data from two events known to be similar, but maps them to different points in the embedding space, the CRNN 460 is re-trained so that it maps the training data from the similar events to similar points in the embedding space.

The comparison component 470 may be configured to process the encoded representation data 462 with respect to one or more custom event profiles 482 using a corresponding threshold 484. As described below in relation to FIG. 5, data storage 480 may store the custom event profile 482 and the corresponding threshold 484 based on the user 505 configuring the device 110 to identify a custom acoustic event. Each of the custom event profiles 482 may be acoustic feature data corresponding to a single custom acoustic event. For example, a first custom event profile 482*a* may correspond to a custom doorbell sound, a second custom event profile 482*b* may correspond to a sound made by a particular brand of appliance in the user's home, etc. Each of the thresholds 484 may be a threshold value of similarity, and may correspond to a single custom acoustic event. For example, a first threshold 484*a* may be a first threshold value corresponding to the first custom event profile 482*a*, a second threshold 484*b* may be a second threshold value corresponding to the second custom event profile 482*b*, etc.

The comparison component 470 may process the encoded representation data 462 with respect to each of the custom event profiles 482, and may determine how similar the encoded representation data 462 is to the custom event profile 482. The comparison component 470 may determine such similarity using various techniques, for example, using a cosine similarity, using a number of overlapping data points within a feature space, using a distance between data points within a feature space, etc. The comparison component 470 may determine that the encoded representation data 462 corresponds to the custom acoustic event represented in the custom event profile 482 when the similarity satisfies the corresponding threshold 484. The similarity may be represented as one or more numerical values or a vector of values, and the threshold 484 may be represented as single numerical value. In some embodiments, the average of the similarity values may exceed/satisfy the threshold 484 for the comparison component 470 to determine that the corresponding custom acoustic event occurred. As described herein, the encoded representation data 462 is a vector and the custom profile event 482 is a vector, and in some embodiments, if each of the values of the encoded representation data 462 (e.g., each of the values of the N-vector) are within the threshold 484 of each of the corresponding values of the custom event profile 482, the comparison component 470 may determine that the corresponding custom acoustic event occurred.

The comparison component 470 may evaluate the encoded representation data 462 with respect to each of the custom event profiles 482, and may determine, in some cases, that more than one custom acoustic event is represented in the event audio 107. For example, the comparison component 470 may process the encoded representation data 462 with respect to the first custom event profile 482*a* to determine first similarity data that satisfies the first threshold 484*a*, and may process (in parallel) the encoded representation data 462 with respect to the second custom event profile 482*b* to determine second similarity data that satisfies the second threshold 484*b*, and may then determine, based on both of the first and second thresholds 484 being satisfied, that the first and second custom acoustic events occurred.

In some embodiments, the comparison-based AED component 140 may determine the detected event 142 in a number of different ways. If multiple examples of the occurrence of an acoustic event are received as represented in audio data, the comparison-based AED component 140 may encode each example to a different point in the embedding space. The different points may define an N-dimensional shape; the comparison component 470 may deem that the encoded representation data 462 defines a point within the shape, or within a threshold distance of a surface of the shape, and thus, indicates occurrence of the corresponding acoustic event. In other embodiments, the comparison-based AED component 140 determines a single point that represents the various points determined from the plurality of occurrences. For example, the single point may represent the average of each of the values of the items of the encoded representation data 462. The single point may further represent the center of the shape defined by the points.

The comparison component 470 may output the detected event data 142 indicating which, if any, of the custom acoustic events (indicated in the data storage 480) occurred based on processing of the event audio 107. The detected event data 142 may include one or more labels or indicators (e.g., Boolean values such as 0/1, yes/no, true/false, etc.) indicating whether and which of the custom acoustic events occurred. In some embodiments, each of the custom event profiles 482 may be associated with an event identifier (e.g., a numerical identifier or a text identifier), and the detected event data 142 may include the event identifier along with the label/indicator. The detected event data 142 may be one or more probabilities or scores representing a likelihood of a respective custom acoustic event occurring. The detected event data 142, for example, may be {front door opening=0.2, back door opening=0.5, microwave beeping=0.0}. The detected event data 142 may be a single value or a vector of values corresponding to any or all of the custom acoustic events enabled/configured at the device 110.

The comparison-based AED component 140 may output an indication of detection of a custom acoustic event as the detected event 142. Such detected event data 142 may include an identifier of the custom acoustic event, a score corresponding to the likelihood of the custom acoustic event occurring, or other related data. Such detected event data 142 may then be sent, over the network(s) 199, to a downstream component, for example notification system(s) 121/event notification component 228 or another device.

Figure 5:
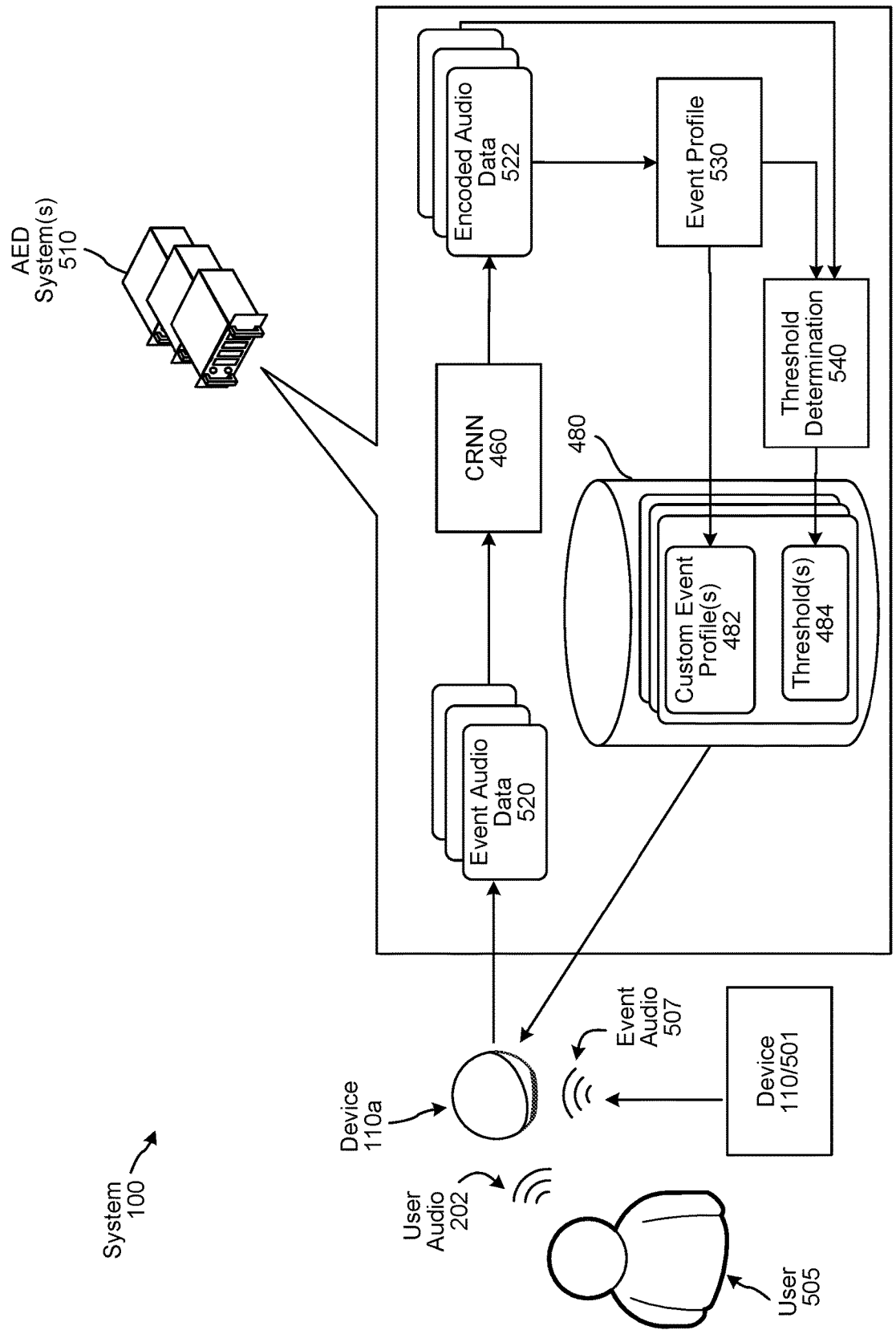
FIG. 5 illustrates a system for generating an event profile for a custom acoustic event for a user according to embodiments of the present disclosure.

FIG. 5 illustrates the system 100 for generating a custom event profile for a custom acoustic event for the user 505. The system 100 may include one or more AED systems 510 in communication with the device 110 over the network(s) 199. In other embodiments, another system, such as, the system 220, may perform the functionality of configuring the device 110 to detect custom acoustic events. In some embodiments, the device 110 may be capable of performing the functionalities of the AED system 510 described herein, and as such, the device 110 may include one or more of the components shown in FIG. 5. In some embodiments, the AED system 510 may be part of a home/private server and/or may be within a user's private network (e.g., the device 110 may communicate with the AED system 510 over a private/restricted network 199), such that the event audio 507 may not be provided/communicated to an external server/system. Such embodiments may increase user privacy.

In some embodiments, the AED system(s) 510 may include the classifier-based AED component 130 and/or the comparison-based AED component 140, and the device 110 may send the audio data 108 to the AED system(s) 510 for processing as described herein (e.g., in relation to FIGS. 1 and 4).

In some cases, the system 100 may configure the comparison-based AED component 140 to detect a sound selected by the user 505 of the device 110. The user 505 may interact with the device 110 using the speech-processing techniques described herein and command the device 110 to learn a new sound with a spoken input such as, "Alexa, I want to you learn a new sound," which may be captured as the user audio 202. The device 110 and/or system 220 may determine the intent of the user 505 by processing the corresponding audio data with the ASR and/or NLU techniques described herein. The device 110 and/or system 220 may identify the AED system(s) 510 as the system to respond to the user audio 202. The AED system(s) 510 may cause the device 110 (and/or another device) to output a prompt asking the user 505 to cause occurrence of the acoustic event associated with the sound that the user wants detected. The AED system(s) 510 may further prompt the user to cause further occurrences of the acoustic event. The device 110 may determine and send audio data representing the occurrence(s) to the AED system(s) 510 to configure the comparison-based AED component 140 using the audio data such that the AED component is configured to detect the new (custom) acoustic event. In other cases, the user 505 may "teach" the system to detect a custom sound using an application installed on the device 110 (e.g., a smartphone, a tablet, etc.), where the user 505 may provide an input causing the application to output the prompt asking the user 505 to cause occurrence of the acoustic event.

The device 110 may receive a spoken input or another type of input (e.g., selection of GUI elements via a display screen, a gesture, etc.) representing a request to detect an acoustic event by the device. An example of such a request is "Alexa, I want you to learn a new sound." As described in greater detail below, the user's environment may include multiple devices, and the device 110 selected to detect the acoustic event may be the device closest to the source (e.g., appliance) of the acoustic event or the device that receives a highest-quality (e.g., highest signal-to-noise ratio signal) audio signal corresponding to the event.

The device 110 may be an always-on device capable of continually detecting acoustic events. As such, the device 110 may be powered using an AC power supply and may thus be difficult or impossible to move in an environment. In addition, the user 505 may wish the device 110 to detect audio events in a first, preferred location, and not in a second location closer to the source of the event.

After issuing the request to detect the acoustic event, the user 505 may, however, be required to move in the environment in order to cause a sound corresponding to the acoustic event. While the sound of the event may be detected by the device 110, the user 505 may not be close enough, when causing the sound, to receive audio or other output of the device 110. The device 110 (and/or the AED system(s) 510) may thus determine a second device, such as a smartphone or cellular phone, that corresponds to the device 110 (e.g., a device that is associated with the same user account as the device 110). The user 505 may thus transport the second device to a location corresponding to a source of the sound of the acoustic event in lieu of transporting the device 110.

The device 110 (or the second device) may output a prompt to cause an occurrence of the acoustic event. The prompt may be an audio output, visual output, haptic (e.g., a vibration), or another type of prompt. The device 110 may receive additional audio corresponding to confirmation of receipt of the prompt. The device 110 may then wait a period of time (e.g., five seconds) for the event to occur. If no event is detected, the device 110 may output an additional prompt.

The user 505 may cause a device (e.g., another device 110 shown in FIG. 10 or another device 501) to generate the custom sound/event audio 107. For example, the user 505 may cause a microwave 110j to beep. As another example, the user 505 may cause a washer/dryer 110h to make a sound. As yet another example, the user 505 may cause a coffee doorbell to ring. The custom sound may be generated by other objects that are not necessarily an electronic device. For example, a custom sound may be opening/closing of a fridge door. As another example, a custom sound may be sounds by a pet bird.

The device 110 may receive event audio 507 representing the occurrence of the event. If the environment includes multiple user devices 110, each one may receive the event audio 107 representing occurrence of the event. Each instance of the event audio 107 from each device 110 may be evaluated to determine a quality value, and the device 110 having the highest quality value may be selected for further processing. The quality metric may be, for example, a signal-to-noise ratio (SNR) of the audio, a loudness of a sound represented in the audio, or other such quality value. The audio may also be evaluated (by the device or the system) to determine a value corresponding to the sufficiency of the audio to provide reference data for an acoustic event detector (e.g., a value representing how good the audio sample will be for training purposes. The value may be based at least in part on various factors such as signal quality, signal length, the appearance of background interfering noise (e.g., speech, unwanted overlapping sound, etc.), number of iterations of the audio data, or the like.

The device 110 may determine if additional audio representing additional occurrences of the acoustic event should be prompted for and received. In some embodiments, the device 110 prompts for a fixed number of occurrences, such as two, three, five, or ten occurrences. In other embodiments, the received audio data is evaluated for its quality (e.g., SNR and/or loudness) and additional prompts are output if the quality satisfies a condition (e.g., is below a threshold). The device 110 may output prompts for additional occurrences if it and/or the AED system(s) 510 fails to configure the comparison-based AED component 140 to detect the new acoustic event.

In some embodiments, the AED system(s) 510 (or other component) may determine an audio capture time window corresponding to how long a device should send audio data to the AED system 510. The audio capture time window may correspond to how long an acoustic event is estimated to take. For example, the audio capture time window may be a certain time for a first event (e.g., a few seconds for a door closing) to a longer time for a different event (e.g., 30 seconds or more for a water tap running/leaking). The audio capture time window may be determined by the system depending on a type of the acoustic event to be detected (e.g., a sudden event, medium length event, drawn out event, etc.) The audio capture time window may allow the system to ensure that no unnecessary audio captured by the device 110 is sent to the AED system 510 for processing, thus further ensuring privacy, increase in accuracy of the event profile, etc. The AED system 510 may then send, to the device 110 (and/or other user device(s)), one or more audio or visual prompts to cause occurrence of the custom acoustic event. The AED system 510 may also instruct the device 110 (or the other device) to send audio data, to the AED system 510, at the beginning of the audio capture time window. The device 110 may output the prompt and capture audio data that represents the occurrence(s) of the custom acoustic event. The AED system 510 may instruct the device 110 to stop audio capture, for example, at the end of the audio capture time window. Instructions to start audio capture and stop audio capture may cause the device 110 to activate and deactivate, respectively, the microphone(s) 820 of the device 110. In another embodiment the system may instruct the device 110 to stop sending audio data after the device/system detects a pause or other break in acoustic activity. For example, the AED system 510 may instruct the device 110 to stop sending audio data upon detecting audio data with a sufficiently low magnitude for a certain period of time. The level of magnitude and/or period of time may be based on the acoustic event. For example, in the case of learning the sound of an expected lengthy event (e.g., a water tap running) the system may not instruct the device to stop sending audio for a longer period of low magnitude audio (e.g., 30 seconds). The system may also instruct the device 110 to stop sending audio upon a sudden change in the audio data. For example, in the case of learning the sound of an expected sudden event, the system may instruct the device to stop sending audio data upon detecting audio of a large magnitude for a short time (e.g., one second or less) and then detecting of audio of a low magnitude for a short time (e.g., one second). The system itself may also perform these evaluations of the audio data in order to determine when to cease audio capture by the device. For example the AED system 510 may process the received event audio data 520 to determine a drop/decrease in magnitude for a certain time period and once detected, may instruct the device 110 to stop audio capture.

In some embodiments, the AED system 510 may send a command to the device 110 when the AED system 510 is expecting the user 510 to cause occurrence of the event audio 507, where the command may cause the device 110 to reduce or stop causing of other sounds that may be outputted by the device 110. The AED system 510 may send one or more commands to other devices 110 that may be within an acoustic environment of the user/device (e.g., such that a sound made by the other device can be captured by the device 110). Sending of such commands may cause the device(s) 110 to mute/turn off a speaker(s) of the device, lower volume of a speaker(s), stop movement of the device (e.g., an autonomously motile device 110k), etc. In some embodiments, the AED system 510 may send a prompt to the device 110 that is presented (e.g., displayed and/or outputted via a speaker) to the user 510, and may request the user to turn off devices or reduce the volume of devices within the acoustic environment of the user/the device. By sending the command and/or prompt, the AED system 510 may reduce background sounds, such as noises that are not related to the custom event, that may be captured along with the event audio 107.

In some embodiments, the AED system 510 may perform filtering on the event audio data 520 to remove known background noises. For example, the AED system 510 may store data representing noises, sounds, etc. made by the autonomously motile device 110k (e.g., while moving), and may use such stored data to filter such audio from the event audio data 520.

The device 110 may process the event audio 507 using an AFE component (e.g., the AFE component 120 described herein) to determine event audio data 520. In such embodiments, the event audio data 520 may be acoustic features, such as, a frequency-domain representation of the event audio 507, LBFE values corresponding to the event audio 507, MFCCs corresponding to the event audio 507, etc. In other embodiments, the event audio data 520 may be the audio data generated by the microphone(s) 820 of the device 110.

The AED system(s) 510 may process the event audio data 520 using the CRNN 460. The CRNN 460 may already be trained using samples representing a wide range of acoustic events, and may be configured as an encoder for audio data corresponding to a variety of acoustic events. The CRNN 460 may output encoded audio data 522, which is a vector of values, corresponding to the event audio data 520. The encoded audio data 522 may be processed by an event profile component 530 to determine the custom event profile 482.

The event profile component 530 may be configured to determine whether additional samples of the custom acoustic event are needed based on the encoded audio data 522 received so far. In some embodiments, the AED system 510 may require a predetermined number of samples of the custom acoustic event to be detected. Such predetermined number of samples may need to satisfy certain conditions, such as, audio quality, SNR, intensity, etc. Based on evaluating the received encoded audio data 522, the AED system 510 may cause the device 110 (or another device) to output a prompt to the user 505 to provide further event audio 507 corresponding to the custom acoustic event. When enough audio data is gathered, the AED system 510 may determine the custom event profile 482 and the threshold 484 for the instant custom acoustic event.

One or more of the points defined by processing the encoded audio data 522 corresponding to the occurrences of the custom acoustic event may be discarded by the event profile component 530. For example, if two or more points are determined to be relatively near each other in the embedding space, but one or more points are determined to be relatively far away from the two or more relatively near points, the relatively far-away point(s) may not be used when determining the vector data for the custom event profile 482 (e.g., when determining the shape, the center, or the average of the points). For example, the device 110 may prompt for three occurrences of the custom acoustic event, but audio data corresponding to one of the occurrences may include noise (e.g., a car horn honked while the doorbell was ringing). This noisy audio data may be identified by its distance, from the other points, in the embedding space, and therefore discarded.

In other embodiments, if there are at least three items of audio data that represent at least three occurrences of the acoustic event, the AED system 510 may determine the shape, average, and/or center of the corresponding points in the embedding space using only two (or other subset) of the points determined from the encoded audio data 522 and then test the result using the third (or other additional) item of audio data. If processing the third item of audio data results in a point corresponding to the shape, average, and/or center determined from the first two items of audio data, the device 110 and/or system 220 may deem that the shape, average, and/or center accurately estimates the occurrence of the custom acoustic event and may be used to generate the custom event profile 482. The AED system 510 may further define the shape, average, and/or center using other combinations of subsets of the audio data and test the shape, average, and/or center with other items of audio data. If, for example, a certain combination of items of audio data results in a shape, average, and/or center that fails to process additional items of audio data to determine that those items correspond to the occurrence of the audio event, those combinations and/or items of audio data common to those combinations may be discarded, and the shape, average, and/or center may be determined using remaining instances of the encoded audio data 522. In some embodiments, the AED system 510 may cause the device 110 (and/or other user device) to prompt the user for additional audio data representing additional occurrences of the custom acoustic event and then process those addition items of audio data to determine the shape, average, and/or center.

The event audio data 520 may represent other audio beyond the event audio 507. In certain situations the AED system 510 may be configured to remove the extraneous audio prior to determining the encoded audio data 522 to be used for generating the custom event profile 482. For example, if the system detects speech in the event audio data 520 (for example using a VAD/VAD techniques or other techniques disclosed herein) the AED system 510 may remove the portion of the audio data representing the speech, and may only proceed using the event audio data 520 with the speech portion removed.

The event profile component 530 may determine the custom event profile 482 to be a vector of values determined from processing the encoded audio data 522 corresponding to two or more samples of the event audio 507 for the custom acoustic event. As described above, the event profile component 530 may evaluate the data points for each sample, determine a shape, a cluster, and/or an average of the data points, and the data points determined to fit the shape/cluster may be included in the custom event profile 482. In other cases, the average of the data points may be included in the custom event profile 482. The vector in the custom event profile 482 may include values in a sequence/order corresponding to time, so that the custom event profile 482 represents how the custom acoustic event is to sound over a duration of time. For example, a particular type of microwave may beep with increasing intensity over a period of 15 seconds, and the custom event profile 482 may represent this information via the sequence/order of values in the vector.

The threshold determination component 540 may determine the threshold 484 for the instant custom acoustic event. In some embodiments, the threshold determination component 540 may process the custom event profile 482 (generated by the event profile component 530) and/or the encoded audio data 522 corresponding to two or more samples of the custom acoustic event. In some embodiments, the threshold determination component 540 may determine metrics corresponding to the encoded audio data 522. Such metrics may relate to false acceptance rate (FAR), false rejection rate (FRR), etc., and may be used to determine the threshold 484 for the instant custom acoustic event. The FAR and FRR metrics may be determined based on which data points fall outside of the shape/cluster used to determine the custom event profile 482. The threshold determination component 540 may further perform aggregated estimation techniques using random/negative samples (samples other than the instant custom acoustic event samples), may augment the positive samples of the instant custom acoustic event, and may compare the random/negative samples and the positive samples using statistical analysis to determine the metrics and the threshold 484.

The determined custom event profile 482 and the corresponding threshold 484 may be stored in the data storage 480. The data storage 480 may be provided to the device 110 (and/or other user devices that are to perform AED) so that it can be used to detect custom acoustic events configured by the user 505. In some embodiments, the custom event profile 482 and the threshold 484 may be stored in/associated with a user profile of the user 505 in the profile storage 270. The custom event profile 482 and the threshold 484 may be used by one or more devices associated with the user profile of the user 505.

In some embodiments, the CRNN 460 may be fine-tuned/retrained using event audio data 520 corresponding to one or more custom acoustic events taught by the user 505. In such cases, the CRNN 460 may be customized/fine-tuned for the user 505/the device 110. Such fine-tuning may enable the CRNN 460 to detect custom acoustic events for the user 505 more accurately than another CRNN that may be configured to for another user/set of custom acoustic events. For fine-tuning, training data may include multiple instances of event audio data 520, and the trained CRNN may be tested against the custom event profiles 482, for the custom acoustic events represented in the training data, to determine accuracy of the trained CRNN.

In some embodiments, the CRNN 460 may be updated/retrained and/or the data storage 480 may be updated based on feedback received from the user 505 when the device 110 detects custom acoustic events (as described in relation to FIG. 1). The device 110 (or another device) may output a notification of a custom acoustic event being detected, however, the user 505 may provide feedback (e.g., via a spoken input, touch input, gesture, etc.) that the custom acoustic event did not in fact occur, the notification is incorrect, the user did not want to be notified of this event, etc. Using such feedback, the device 110/the AED system 510 may update the CRNN 460, the custom event profile 482, and/or the threshold 484. For example, the threshold 484 may be updated so that the custom sound is detected less often. As another example, the user may be asked to teach the custom sound again (as described in relation to FIG. 5), and the custom event profile 482 may be updated. As yet another examples, the CRNN 460 may be updated/retrained/fine-tuned using audio captured within the user's environment.

In some embodiments, the user 505 may wish to configure the device 110 to perform one or more "if-then" determinations based on two or more custom acoustic events. For example, the user 505 may not wish to be notified every time the device 110 detects that a microwave beeps; instead, the user may wish that the device 110 determines that, upon detection of the microwave beeping, it will send data to a second user device notifying the user 505 of the beeping only if it does not detect the sound of the door of the microwave opening and/or closing within a period of time after detection of the beeping (e.g., five minutes). The user 505 may speak an utterance specifying this condition and/or the AED system 510 may determine that such a condition is likely (e.g., determining that the first acoustic event corresponds to a timer expiring and cause output, by the device 110, of a prompt requesting the user 505 to cause occurrence of the second custom acoustic event (upon which the first custom acoustic event is dependent/conditioned on).

FIGS. 6A, 6B, and 6C illustrate methods of using AED components according to embodiments of the present disclosure. Referring first to FIG. 6A, in some embodiments, the device 110 determines (602) that audio data received from a microphone includes a wakeword. The device 110 may be configured, as described above, to recognize the wakeword in received audio data and then send, to the remote system, corresponding audio data 604. The system 220 may process the audio data (using, e.g., the ASR and/or NLU techniques described herein) to determine (606) that the audio data corresponds to a command to define a new acoustic event.

The system 220 may then send a request (608) to the AED system 510 to learn the new event. The AED system 510 (or other component) may determine (609) an audio capture time window corresponding to how long a device should send audio data to the AED system 510 (or otherwise send audio data related to the training). The audio capture time window may correspond to how long an acoustic event is estimated to take. For example, the audio capture time window may be a certain time for a first event (e.g., a few seconds for a door closing) to a longer time for a different event (e.g., 30 seconds or more for a toilet running). The audio capture time window may be determined by the system depending on a type of the acoustic event to be detected (e.g., a sudden event, medium length event, drawn out event, etc.) The audio capture time window may allow the system to ensure that no unnecessary audio captured by the device 110 is sent to the system, thus further ensuring privacy, etc. The AED system 510 may then send (610), to the device 110 (and/or other device(s)), one or more audio or visual prompts to cause occurrence of the event. The AED system 510 may also instruct (611) (e.g., by sending a command) the device 110 (or other device) to send audio data at the beginning of the audio capture time window. The device 110 may output the prompt and capture (612) audio data that represents the occurrence(s) of the events. The AED system 510 may instruct (613) (e.g., by sending a command) the device to stop audio capture at the end of the audio capture time window. The instruction to stop sending audio data 613 may be included with the instruction 611 to send audio data (e.g., a single instruction maybe sent along with time information indicating how long the device should capture/send audio for in order to capture the audio of the desired acoustic event.) The instruction to stop sending audio data 613 may also be sent after the event audio data is sent 614. In another embodiment the system may instruct the device 110 to stop sending audio data after the device/system detects a pause or other break in acoustic activity. For example, upon sending the instruction (611) to send audio data, the system may instruct the device 110 to stop sending audio data upon detecting audio data with a sufficiently low magnitude for a certain period of time. The level of magnitude and/or period of time may be based on the acoustic event. For example, in the case of learning the sound of an expected lengthy event (e.g., a toilet running) the system may not instruct the device to stop sending audio for a longer period of low magnitude audio (e.g., 30 seconds). The system may also instruct the device 110 to stop sending audio upon a sudden change in the audio data. For example, in the case of learning the sound of an expected sudden event, the system may instruct the device to stop sending audio data upon detecting audio of a large magnitude for a short time (e.g., one second or less) and then detecting of audio of a low magnitude for a short time (e.g., one second). The system itself may also perform these evaluations of the audio data in order to determine when to cease audio capture by the device. For example the system (e.g., 510) may process the received event audio data (e.g., audio data send in step 614) to determine a drop in magnitude for a certain time period and once detected, may instruct (613) the device 110 to stop audio capture.

The device may then send corresponding event audio data 614 to the AED system 510, which may then determine (616) the custom event profile 482 using the audio data, as described above. The AED system 510 may then send custom event profile data 618 (e.g., data vectors representing points in embedding space, and/or other data) to the device 110. Additionally, the AED system 510 may determine the threshold 484 using the audio data, and send the threshold, along with the custom event profile data 618, to the device 110.

The event audio data 614 may represent other audio beyond the event audio data 614. In certain situations the system 220/510 may be configured to remove the extraneous audio prior to determining (616) the custom event profile using the audio data. For example, if the system detects speech in the event audio data (for example using a VAD/VAD techniques or other techniques disclosed herein) the system may remove the portion of the audio data representing the speech and may only proceed to training/configuring the AED component using the event audio data with the speech portion removed.

Referring to FIG. 6B, a first device 110a may detect an event 620, which may be a user-defined event, as described herein. The first device 110a (which may be, for example, an Amazon Echo) may send an indication 622 of detection of the event to a second device 110b (which may be, for example, a smartphone). The second device 110b may output (624) an indication of the detection.

The first device 110a may also send event data 626 corresponding to the event to the AED system 510. As described herein, the first device 110 may detect the custom event based on limited samples, so the event data 626 may be regarded as additional samples. The AED system 510 may, using the event data 626, determine (630) updated custom event profile data (and/or updated corresponding threshold) and send the custom event profile data (and/or the threshold) 632 to the first device 110*a*.

Referring to FIG. 6C, the user 505 of the device 110 may wish to configure the device 110 to perform one or more "if-then" determinations based on two or more acoustic events. For example, the user 505 may not wish to be notified every time the device 110 detects that a microwave beeps; instead, the user may wish that the device 110 determines that, upon detection of the microwave beeping, it will send data to a second device notifying the user 505 of the beep only if it does not detect the sound of the door of the microwave opening and/or closing within a period of time after detection of the beep (e.g., five minutes). The user 505 may speak an utterance specifying this condition and/or the device 110 and/or the system 220 may determine that such a condition is likely (e.g., determining that the first acoustic event corresponds to a timer expiring and cause output, by the device 110, of a prompt for the second acoustic event.

The first device 110*a* may thus detect (640) occurrence of the first event (e.g., a microwave beeping) but may then wait for a period of time for detection of the second event (e.g., the microwave door opening/closing). If the first device 110*a* fails (642) to detect the second event within the time period, it may then send an indication 644 of the event to the second device 110*b*. The second device 110*b* may output (646) sound, video, or other output corresponding to the indication.

The user of the second device 110*b* may send, to the first device 110*a*, an indication 648 of success or failure. For example, the user 505 may receive the indication that the microwave door did not open or close, even though the user 505 did in fact open and close the microwave door. The first device 110*a* may then send second event data 650 to the AED system 510 (e.g., the audio data that may include a representation of the microwave door opening and/or closing), and the AED system 510 may similarly determine (652) updated custom event profile such that, given the second event data 650, it determines that the second event data 650 includes a representation of the second event. The AED system 510 may then send corresponding custom event profile data 654 to the first device 110*a*.

Figure 7:
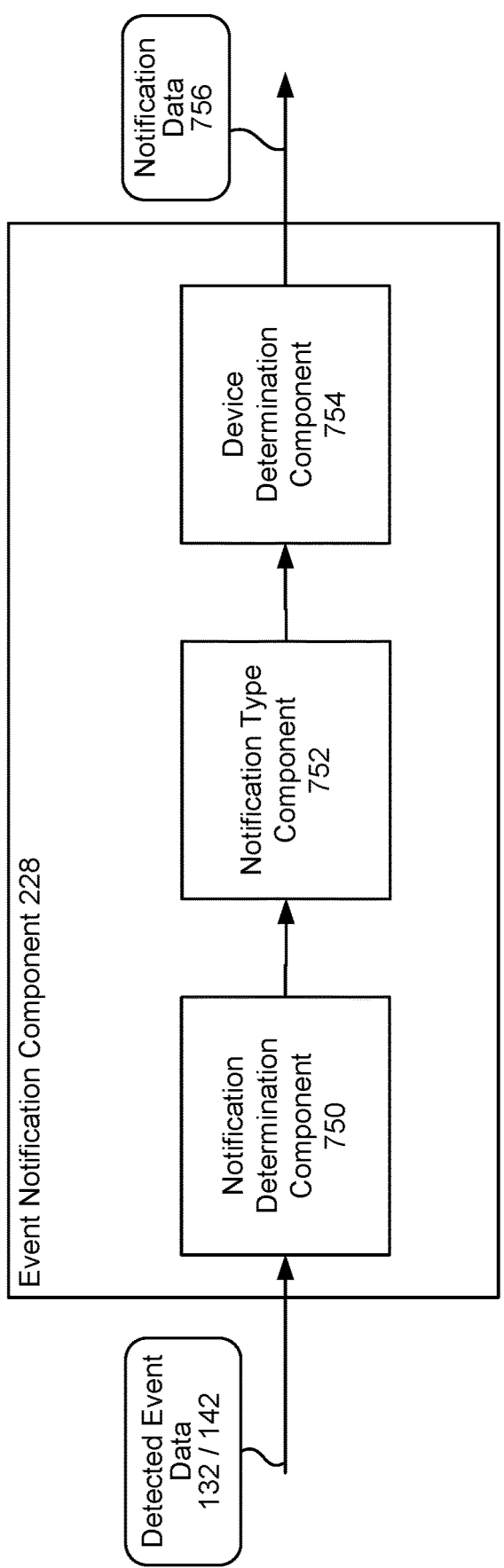
FIG. 7 illustrates an event-notification component according to embodiments of the present disclosure.

FIG. 7 illustrates example components of the notification system(s) 121. As shown in FIG. 7, the event-notification component 228 may include a notification-determination component 750, a notification-type component 752, and/or a device-determination component 754. The notification-determination component 750 may receive one or more of the detected event data 132, 142 and determine if a notification corresponding to the event(s) should be sent to one or more device(s) associated with a user profile of the user 505 or other devices. The detected event data 132/142 may, for example, indicate a first kind of event, such as glass breaking or a baby crying, and the notification-determination component 750 may determine that a corresponding notification should be sent to a user device. The detected event data 132/142 may, on the other hand, indicate a second kind of event, such as a dog bark, and the notification-determination component 750 may determine that no notification may be sent. The notification-determination component 750 may make this determination by determining data identifying the event and determining a corresponding user preference (as stored in, for example, the profile storage 270) for receiving notifications corresponding to the event. That is, a user of the user device may have input a preference for receiving a notification corresponding to a particular event, and the notification-determination component 750 may determine to send a notification based on the preference. In some embodiments, the notification-determination component 750 determines whether or not to send a notification based at least in part on the type of the event. For example, if the event corresponds to a potentially dangerous or rare event, such as glass breaking, the notification-determination component 750 may determine to send the notification.

The notification-type component 752 may determine the type of the notification to be sent. Types of notifications may include text messages, emails, phone calls, push notifications, or other such notifications. Like the notification-determination component 750, the notification-type component 752 may determine the type of the notification based on a user preference stored in the profile storage 270. The notification-type component 752 may similarly determine the type of the notification based on the type of the event, wherein potentially dangerous or rare events may correspond to a first type of notification, such as a phone call, while other types of events may correspond to a second type of notification, such as an email.

A device-determination component 754 may determine which of a potential plurality of user devices should receive the notification(s). In some embodiments, the device-determination component 754 may determine that the notification(s) (e.g., notification data 756) are to be sent to every device associated with a user account stored in the profile storage 270. In other embodiments, the device-determination component 754 determines that the notification(s) are to be send to a subset of the devices. For example, for one event (e.g., a high priority event) a user may indicate that every device associated with the user profile be notified if the event is detected. In another example, for a different event (e.g., a low priority event) a user may indicate that only a single specific device associated with the user profile be notified if the event is detected. In another example, a user may indicate that another device outside the user profile be notified if an event is detected (e.g., if a toilet running is detected send a notification to a device/telephone number associated with a plumber).

The system 100 may be used to create various acoustic event detection data for different events as detectable by different devices in different locations. For example, for a same acoustic event, the system may prompt the user to walk through audio capture by several different devices (for example one device in the living room, one device in the kitchen, etc.). The system 100 may instruct the user to cause the event and may capture acoustic data from multiple different devices while the event occurs. The system 100 may use this combined information to form one set of AED configuration data that may be used by multiple devices (e.g., jointly trained AED data goes to each device). Alternatively (or in addition) the system 100 may use the audio data from each device to train different AED configuration data for the different devices. For example, the audio data captured by the kitchen device may be used to train AED configuration data to be used by the kitchen device and audio data captured by a living room device may be used to train AED configuration data to be used by the living room device, thus resulting in two different trained AED models even though they are trained to detect the same acoustic event, albeit from different locations (and potentially different devices).

The system 100 may also be used to create various acoustic event detection data for the same as detectable by a same device, though if the event occurs in a different location relative to the detecting device. For example, to a device in a kitchen an electronic toy left on may sound different when the toy is in the living room as opposed the toy being in the dining room (depending, of course, on home acoustics, properties of the sound, properties of the detecting device, etc.). In such a situation the system may create one set of AED configuration data (e.g., trained AED model) for the acoustic event from a first location and another set of AED configuration data (e.g., trained AED model) for the acoustic event from a second location different from the first location. To do so the system may need to go through the training/prompting steps for each location and then may capture respective audio data corresponding to the respective location in order to train the separate AED model(s). The AED model(s) may then be loaded onto a device 110 which, when it attempts to detect a future event, may operate both AED model(s). Thus if a particular model is used to detect the event, the device 110 may also be able to output an indication of a location of a source of the event based on which AED model was used to recognize the event. For example, if an AED model corresponding to an acoustic event originating in location A (e.g., the living) results in a higher confidence than an AED model corresponding to the same acoustic event originating in location B (e.g., the dining room), the device 110 may output an indication that the event was detected in location A.

In certain configurations, if the user replaces a device 110*a* at a particular location, the user may indicate to the system that the new device 110*b* will be located at the same location. The system may then send the appropriate AED configuration data (e.g., AED model(s)) to the new device 110*b* so the new device 110*b* can be configured to recognize the same custom acoustic events as the prior/replaced device 110*a*.

Figure 8:
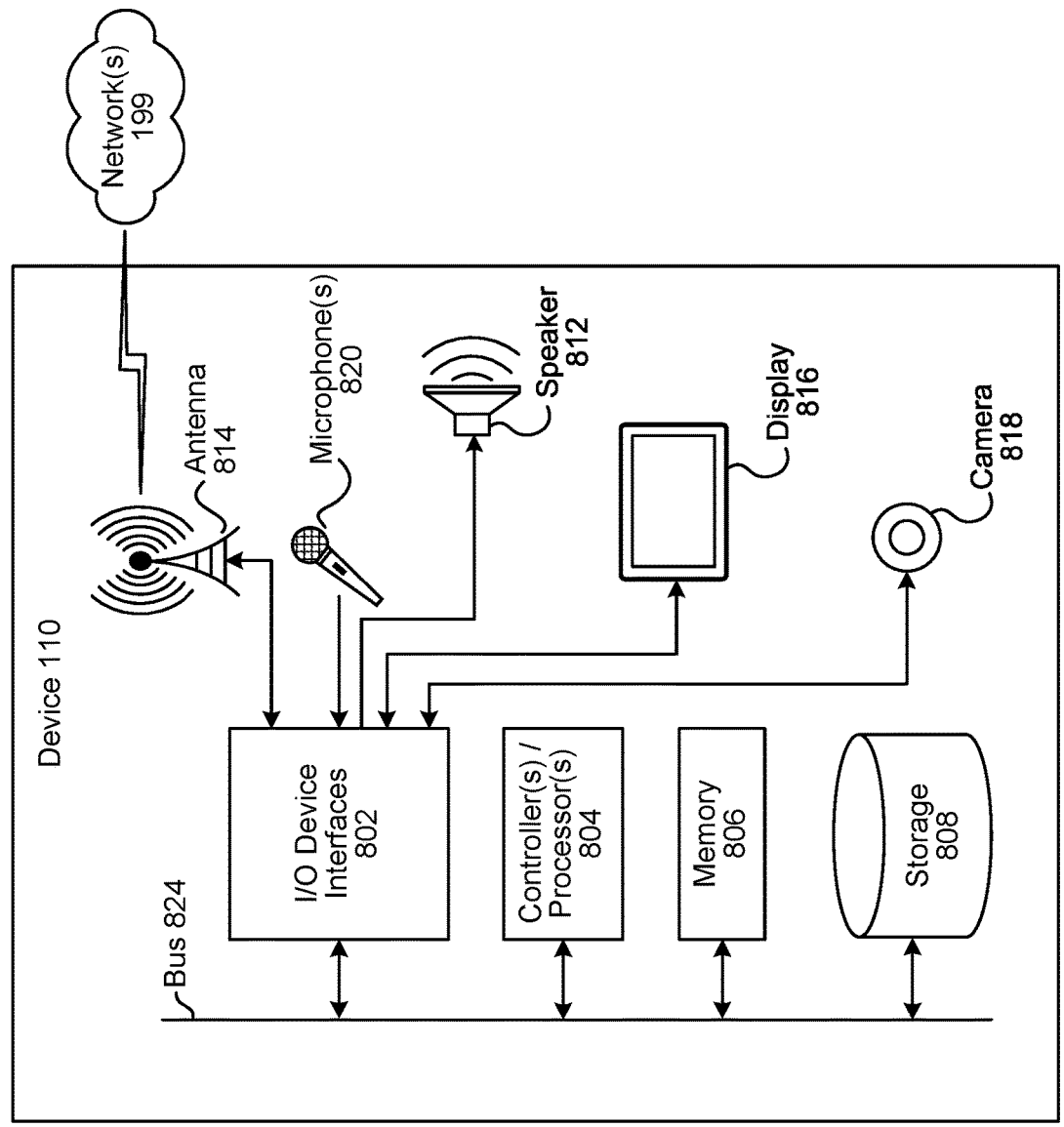
FIG. 8 is a block diagram conceptually illustrating example components of a device, according to embodiments of the present disclosure.
Figure 9:
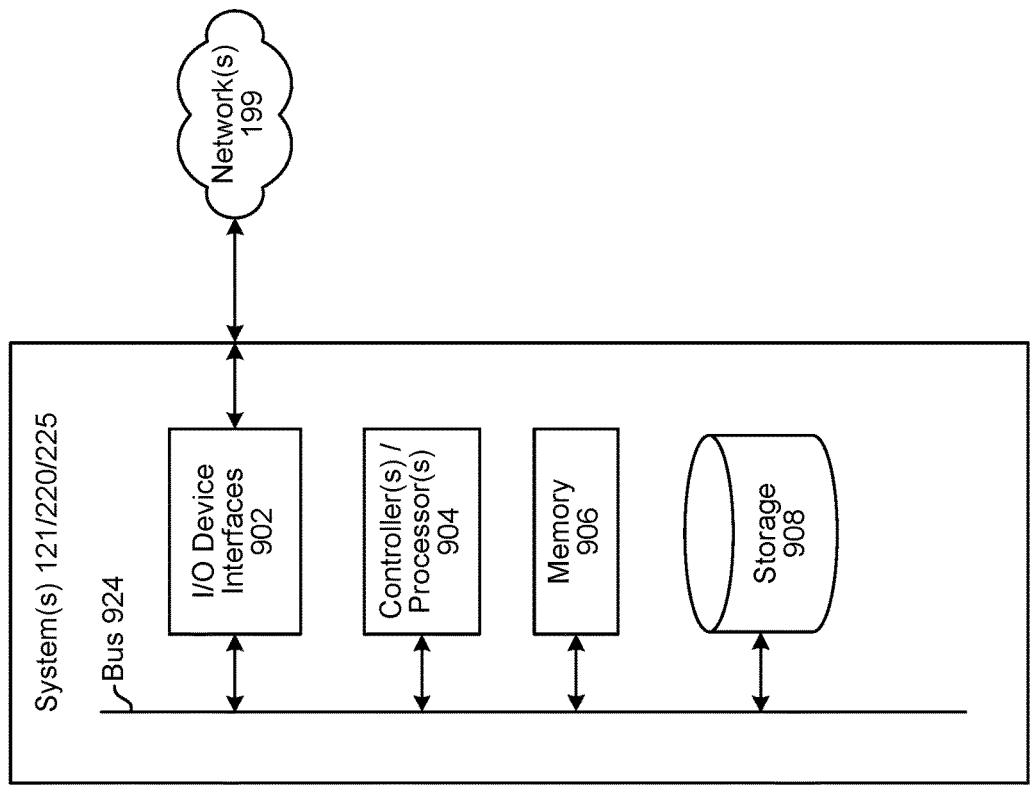
FIG. 9 is a block diagram conceptually illustrating example components of a system, according to embodiments of the present disclosure.

FIG. 8 is a block diagram conceptually illustrating a device 110 of the system 100. FIG. 9 is a block diagram conceptually illustrating example components of a system, such as the notification system(s) 121, the system 220 and the skill(s) system 225. A system (121/220/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (121/220/225) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (121/220/225) may be included in the system 100 of the present disclosure, such as, one or more notification systems 121, one or more systems 220 and/or one or more skills 225. In operation, each of these systems may include computer-readable and computer-executable instructions that reside on the respective device (220/225), as will be discussed further below.

Each of these devices (110/121/220/225) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/121/220/225) may also include a data storage component (808/908) for storing data and controller/processor-executable instructions. Each data storage component (808/908) may individually include one or more non-volatile storage types such as magnetic storage, optical storage, solid-state storage, etc. Each device (110/121/220/225) may also be connected to removable or external non-volatile memory and/or storage (such as a removable memory card, memory key drive, networked storage, etc.) through respective input/output device interfaces (802/902).

Computer instructions for operating each device (110/121/220/225) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/121/220/225) includes input/output device interfaces (802/902). A variety of components may be connected through the input/output device interfaces (802/902), as will be discussed further below. Additionally, each device (110/121/220/225) may include an address/data bus (824/924) for conveying data among components of the respective device. Each component within a device (110/121/220/225) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device 110, the notification system 121, the system 220, and/or skill system 225 may include their own dedicated processors, memory, and/or storage. Alternatively, one or more of the components of the device 110, the notification system 121, the system 220, and/or skill system 225 may utilize the I/O interfaces (802/902), processor(s) (804/904), memory (806/906), and/or storage (808/908) of the device 110, the system 121, the system 220, and/or skill 225, respectively.

As noted above, multiple devices may be employed in a single system. In such a multi-device system, each of the devices may include different components for performing different aspects of the system's processing. The multiple devices may include overlapping components. The components of the device 110, the notification system 121, the system 220, and the skill system 225, as described herein, are illustrative, and may be located as a stand-alone device or may be included, in whole or in part, as a component of a larger device or system.

As illustrated in FIG. 10, multiple devices (110a-110j, 121, 220, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, a microwave 110j, autonomously motile device 110k (e.g., a robot) etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the notification system 121, the system 220, the skill system 225, and/or others. The support devices may connect to the network(s) 199 through a wired connection or wireless connection.

The concepts disclosed herein may be applied within a number of different devices and computer systems, including, for example, general-purpose computing systems, speech-processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, by a device associated with a user profile, first audio data including a plurality of audio frames;
   determining, using first audio frames of the plurality of audio frames, first feature data representing log Mel-filterbank energy features;
   processing the first feature data using a first convolutional recurrent neural network (CRNN) to determine first encoded representation data, the first CRNN configured as an encoder associated with a first acoustic event detector to detect an acoustic event from a predetermined set of acoustic events;
   processing the first feature data using a second CRNN to determine second encoded representation data, the second CRNN configured as an encoder associated with a second acoustic event detector different from the first acoustic event detector, the second acoustic event detector configured to detect an acoustic event from a custom set of acoustic events associated with the user profile;
   determining, using the first encoded representation data and the first acoustic event detector, a likelihood that a first acoustic event from the predetermined set of acoustic events is represented in the first audio frames;

determining, using the second encoded representation data and the second acoustic event detector, comparison data representing that a second acoustic event from the custom set of acoustic events is represented in the first audio frames; and determining, based at least in part on the likelihood and the comparison data, output data indicating that at least one of the first acoustic event or the second acoustic event occurred.

2. The computer-implemented method of claim 1, wherein determining the likelihood that the first acoustic event is represented in the first audio frames comprises:

processing the first encoded representation data using a classifier of the first acoustic event detector, the classifier configured to detect occurrence of one or more of the predetermined set of acoustic events;

determining, based on processing by the classifier, the likelihood that the first acoustic event occurred; and determining, based on the likelihood, that the first acoustic event is represented in the first audio frames.

3. The computer-implemented method of claim 1, wherein determining the comparison data representing that the second acoustic event is represented in the first audio frames comprises:

using a comparison component of the second acoustic event detector to process the second encoded representation data with respect to stored custom event profile data associated with the second acoustic event and the user profile;

determining the comparison data representing a cosine similarity between the second encoded representation data and the stored custom event profile data; and determining, based on the comparison data satisfying a threshold associated with the stored custom event profile data, that the second acoustic event is represented in the first audio frames.

4. The computer-implemented method of claim 3, further comprising, prior to receiving the first audio data:

receiving second audio data representing occurrence of the second acoustic event;

determining, using the second CRNN and the second audio data, third encoded representation data;

receiving third audio data representing occurrence of the second acoustic event;

determining, using the second CRNN and the third audio data, fourth encoded representation data;

determining, using the third encoded representation data and the fourth encoded representation data, the stored custom event profile data corresponding to the second acoustic event; and determining, using the third encoded representation data and the fourth encoded representation data, the threshold corresponding to detection of the second acoustic event.

5. A computer-implemented method comprising:

receiving, by a device, first audio data;

determining, using the first audio data, first acoustic feature data;

determining, by processing the first acoustic feature data using a first acoustic event detection (AED) component configured to detect occurrence of one or more acoustic events from a predetermined set of acoustic events, first event detection data representing a likelihood that at least one acoustic event from the predetermined set of acoustic events is represented in the first audio data, wherein the first AED component is a classifier-based AED component;

determining, by processing the first acoustic feature data using a second AED component configured to detect occurrence of one or more acoustic events from a custom set of acoustic events associated with the device, second event detection data based at least in part on a comparison of the first acoustic feature data with stored event data representing the custom set of acoustic events, wherein the second AED component is a comparison-based AED component;

determining, based at least in part on the first event detection data and the second event detection data, that at least one of a first acoustic event from the predetermined set of acoustic events or a second acoustic event from the custom set of acoustic events is represented in the first audio data; and determining output data indicating that at least one of the first acoustic event or the second acoustic event occurred.

6. The computer-implemented method of claim 5, wherein processing the first acoustic feature data using the first AED component comprises:

processing the first acoustic feature data using a convolutional recurrent neural network (CRNN) to determine encoded representation data, wherein the CRNN is configured as an encoder associated with the first AED component to detect an acoustic event from the predetermined set of acoustic events;

processing the encoded representation data using a classifier of the first AED component configured to detect occurrence of one or more of the predetermined set of acoustic events; and determining, based on processing by the classifier, that the first acoustic event is represented in the first audio data.

7. The computer-implemented method of claim 6, further comprising:

determining, using the first acoustic feature data and a feature normalization component associated with the first AED component, normalized feature data, wherein the feature normalization component is configured using audio samples corresponding to the predetermined set of acoustic events; and processing the normalized feature data using the CRNN.

8. The computer-implemented method of claim 5, wherein processing the first acoustic feature data using the second AED component comprises:

processing the first acoustic feature data using a CRNN to determine first encoded representation data, wherein the CRNN is configured as an encoder associated with the second AED component to detect an acoustic event from the custom set of acoustic events;

processing the first encoded representation data with respect to stored custom event profile data associated with a user profile associated with the device; and determining, based on processing the first encoded representation data with respect to stored custom event profile data, that the second acoustic event is represented in the first audio data.

9. The computer-implemented method of claim 8, further comprising:

determining, using the first acoustic feature data and a feature normalization component associated with the second AED component, normalized feature data, wherein the feature normalization component is configured using audio samples corresponding to a plurality of acoustic events; and processing the normalized feature data using the CRNN.

43

10. The computer-implemented method of claim 8, further comprising:
  determining a threshold associated with the stored custom event profile data; and
  determining, based on the first encoded representation data, the stored custom event profile data and the threshold, that the second acoustic event is represented in the first audio data.

11. The computer-implemented method of claim 8, further comprising prior to receiving the first audio data:
  receiving second audio data representing occurrence of the second acoustic event;
  determining, using the CRNN and the second audio data, second encoded representation data;
  receiving third audio data representing occurrence of the second acoustic event;
  determining, using the CRNN and the third audio data, third encoded representation data; and
  determining, using the second encoded representation data and the third encoded representation data, the stored custom event profile data corresponding to the second acoustic event.

12. The computer-implemented method of claim 11, further comprising:
  determining, using the second encoded representation data and the third encoded representation data, a threshold corresponding to detection of the second acoustic event.

13. A system comprising:
  at least one processor; and
  at least one memory including instructions that, when executed by the at least one processor, cause the system to:
    receive, from a device, first audio data;
    determine, using the first audio data, first acoustic feature data;
    determine, by processing the first acoustic feature data using a first acoustic event detection (AED) component configured to detect occurrence of one or more acoustic events from a predetermined set of acoustic events, first event detection data representing a likelihood that at least one acoustic event from the predetermined set of acoustic events is represented in the first audio data, wherein the first AED component is a classifier-based AED component;
    determine, by processing the first acoustic feature data using a second AED component configured to detect occurrence of one or more acoustic events from a custom set of acoustic events associated with the device, second event detection data based at least in part on a comparison of the first acoustic feature data with stored event data representing the custom set of acoustic events, wherein the second AED component is a comparison-based AED component;
    determine, based at least in part on the first event detection data and the second event detection data, that at least one of a first acoustic event from the predetermined set of acoustic events or a second acoustic event from the custom set of acoustic events is represented in the first audio data; and
    determine output data indicating that at least one of the first acoustic event or the second acoustic event occurred.

44

14. The system of claim 13, wherein the at least one memory includes further instructions that, when executed by the at least one processor, further cause the system to:
  process the first acoustic feature data using a convolutional recurrent neural network (CRNN) to determine encoded representation data, wherein the CRNN is configured as an encoder associated with the first AED component to detect an acoustic event from the predetermined set of acoustic events;
  process the encoded representation data using a classifier of the first AED component configured to detect occurrence of one or more of the predetermined set of acoustic events; and
  determine, based on processing by the classifier, that the first acoustic event is represented in the first audio data.

15. The system of claim 14, wherein the at least one memory includes further instructions that, when executed by the at least one processor, further cause the system to:
  determine, using the first acoustic feature data and a feature normalization component associated with the first AED component, normalized feature data, wherein the feature normalization component is configured using audio samples corresponding to the predetermined set of acoustic events; and
  process the normalized feature data using the CRNN.

16. The system of claim 13, wherein the at least one memory includes further instructions that, when executed by the at least one processor, further cause the system to:
  process the first acoustic feature data using a CRNN to determine first encoded representation data, wherein the CRNN is configured as an encoder associated with the second AED component to detect an acoustic event from the custom set of acoustic events;
  process the first encoded representation data with respect to stored custom event profile data associated with a user profile associated with the device; and
  determine, based on processing the first encoded representation data with respect to stored custom event profile data, that the second acoustic event is represented in the first audio data.

17. The system of claim 16, wherein the at least one memory includes further instructions that, when executed by the at least one processor, further cause the system to:
  determine, using the first acoustic feature data and a feature normalization component associated with the second AED component, normalized feature data, wherein the feature normalization component is configured using audio samples corresponding to a plurality of acoustic events; and
  process the normalized feature data using the CRNN.

18. The system of claim 16, wherein the at least one memory includes further instructions that, when executed by the at least one processor, further cause the system to:
  determine a threshold associated with the stored custom event profile data; and
  determine, based on the first encoded representation data, the stored custom event profile data and the threshold, that the second acoustic event is represented in the first audio data.

19. The system of claim 16, wherein the at least one memory includes further instructions that, when executed by the at least one processor, further cause the system to:
  receive second audio data representing occurrence of the second acoustic event;
  determine, using the CRNN and the second audio data, second encoded representation data;

receive third audio data representing occurrence of the second acoustic event;

determine, using the CRNN and the third audio data, third encoded representation data; and determine, using the second encoded representation data and the third encoded representation data, the stored custom event profile data corresponding to the second acoustic event.

20. The system of claim 19, wherein the at least one memory includes further instructions that, when executed by the at least one processor, further cause the system to:

determine, using the second encoded representation data and the third encoded representation data, a threshold corresponding to detection of the second acoustic event.

* * * * *